(12) United States Patent
Kaup et al.

(10) Patent No.: US 11,246,685 B2
(45) Date of Patent: Feb. 15, 2022

(54) DENTAL CONNECTION ASSEMBLY AND METHOD FOR PRODUCING A DENTAL PROSTHESIS

(71) Applicant: Nobel Biocare Services AG, Kloten (CH)

(72) Inventors: Thomas Kaup, Affoltern am Albis (CH); Jorg Weitzel, Rielasingen-Worblingen (DE); Roberto Carretta, Zug (CH); Piers Christiansen, Zurich (CH); Raquel Tschopp, Aarau Rohr (CH)

(73) Assignee: Nobel Biocare Services AG, Kloten (CH)

( * ) Notice: Subject to any disclaimer, the term of this patent is extended or adjusted under 35 U.S.C. 154(b) by 0 days.

(21) Appl. No.: 15/736,288

(22) PCT Filed: Jun. 17, 2016

(86) PCT No.: PCT/EP2016/064102
§ 371 (c)(1),
(2) Date: Dec. 13, 2017

(87) PCT Pub. No.: WO2016/203030
PCT Pub. Date: Dec. 22, 2016

(65) Prior Publication Data
US 2018/0185123 A1    Jul. 5, 2018

(30) Foreign Application Priority Data

Jun. 19, 2015 (EP) .................................... 15172921
Apr. 20, 2016 (EP) .................................... 16166121

(51) Int. Cl.
*A61C 8/00* (2006.01)
*A61C 13/34* (2006.01)
(Continued)

(52) U.S. Cl.
CPC .......... *A61C 8/0053* (2013.01); *A61C 8/0048* (2013.01); *A61C 8/0059* (2013.01);
(Continued)

(58) Field of Classification Search
CPC ... A61C 8/0048; A61C 8/0059; A61C 8/0062; A61C 8/0068; A61C 8/0071;
(Continued)

(56) References Cited

U.S. PATENT DOCUMENTS 3,732,621 A * 5/1973 Bostrom .............. A61C 8/0022
433/174
4,832,601 A * 5/1989 Linden ................... A61C 8/005
433/173

(Continued)

FOREIGN PATENT DOCUMENTS

EP        1018972 61       5/2006
WO        WO 90/04951 A1   5/1990
(Continued)

OTHER PUBLICATIONS

Written Opinion dated Sep. 29, 2016 for International Application No. PCT/EP2016/064102 filed Jun. 17, 2016 in 13 pages.
(Continued)

*Primary Examiner* — Ralph A Lewis
(74) *Attorney, Agent, or Firm* — Knobbe, Martens, Olson & Bear, LLP

(57) ABSTRACT

The present invention relates to a connection assembly for attaching a dental component to a dental implant, a dental component for the connection assembly and a method to use the connection assembly. The connection assembly (100; 1100; 2100; 3100) is removably attachable to the dental implant (10; 1010; 2010; 3010), preferably with the dental component (20; 1020; 2020; 3020) attached to the connection assembly, and a dental component is attachable to the
(Continued)

connection assembly in a pre-fastened state or a fastened state. The pre-fastened state, when the connection assembly is attached to the dental implant, the connection assembly allows for adjustment of a relative position and/or orientation between the dental component and the dental implant. In the fastened state, the relative position and/or orientation between the dental component and the connection assembly is fixed, while the connection assembly is in particular detachable from the dental implant with the dental component attached to the connection assembly in the fastened state.

27 Claims, 10 Drawing Sheets

(51) Int. Cl.
    *A61C 13/265*     (2006.01)
    *A61C 13/107*     (2006.01)

(52) U.S. Cl.
    CPC .......... *A61C 8/0062* (2013.01); *A61C 8/0068* (2013.01); *A61C 8/0071* (2013.01); *A61C 13/0001* (2013.01); *A61C 13/2656* (2013.01); *A61C 13/34* (2013.01); *A61C 8/0065* (2013.01)

(58) Field of Classification Search
    CPC ... A61C 8/0053; A61C 8/0054; A61C 8/0065; A61C 8/0066
    See application file for complete search history.

(56) References Cited

U.S. PATENT DOCUMENTS

| | | | |
|---|---|---|---|
| 5,468,150 A * | 11/1995 | Brammann | A61C 8/0065 433/173 |
| 5,997,299 A | 12/1999 | Unger | |
| 6,319,000 B1 | 11/2001 | Branemark | |
| 6,461,160 B1 | 10/2002 | Sutter | |
| 6,843,653 B2 | 1/2005 | Carlton | |
| 8,348,668 B2 | 1/2013 | Lauridsen et al. | |
| 8,905,757 B2 | 12/2014 | Kats | |
| 2008/0261174 A1 * | 10/2008 | Gittleman | A61C 8/0048 433/172 |
| 2009/0246733 A1 | 10/2009 | Auderset et al. | |
| 2014/0017631 A1 * | 1/2014 | Benzon | A61C 8/0053 433/173 |
| 2014/0065574 A1 | 3/2014 | Benzon | |
| 2014/0154643 A1 * | 6/2014 | Benzon | A61C 8/0053 433/173 |
| 2017/0202649 A1 | 7/2017 | Bernhard et al. | |

FOREIGN PATENT DOCUMENTS

| WO | WO 99/17676 | 4/1999 |
|---|---|---|
| WO | WO 01/47429 A1 | 7/2001 |
| WO | WO 2013/188935 A1 | 12/2013 |

OTHER PUBLICATIONS

International Search Report dated Sep. 29, 2016 for International Application No. PCT/EP2016/064102 filed Jun. 17, 2016 in 7 pages.

* cited by examiner

DENTAL CONNECTION ASSEMBLY AND METHOD FOR PRODUCING A DENTAL PROSTHESIS

CROSS-REFERENCE TO RELATED APPLICATIONS

This application is a national stage application under 35 U.S.C. § 371 of International Application No. PCT/EP2016/064102, filed on Jun. 17, 2016, which published in English as WO 2016/203030 A1 on Dec. 22, 2016 and which claims priority benefit of EP Patent Application No. 15172921.7 filed on Jun. 19, 2015 and of EP Patent Application No. 16166121.0 filed Apr. 20, 2016.

FIELD OF THE INVENTION

The invention relates to a connection assembly for attaching a dental component to a dental implant, a dental component for the connection assembly and methods for using the connection assembly in the workflow of a dental restoration.

BACKGROUND ART

Although dental restorations supported by implants have become a common treatment, one of the remaining challenges is an efficient and accurate positioning of the restoration. Ideally, the longitudinal axes of the implant and a through hole of a dental restoration for fastening said dental restoration coincide. However, in reality, there are several sources of error that result in a sub-optimal alignment between an implant and a dental restoration. Such a sub-optimal alignment may well lead to higher tensions within the bone tissue, the implant or the dental restoration, which may adversely affect the lifetime of the restoration.

There is generally a difference between the location of an implant as planned and as actually implanted in the mouth of a patient and implantation. Although this process may be assisted by guidance systems, the implantation itself basically remains manual work with its known drawbacks concerning the precision of placement. Although there may be no significant effect on the immediate result of treatments, i.e. a working dental restoration, any corrections that have to be made after implantation generates additional costs and chair time for the patient. In addition, if no passive fit for a screw used in the treatment can be achieved, tension can be introduced into the screw possibly leading to a screw failure, which could require further treatments generating additional costs and chair time for the patient.

The dental situation of a patient such as the amount of available bone and/or hardness of the bone of the mandible and/or maxilla might require the implant to be implanted in a depth and/or direction that requires additional measures in order to fit a dental restoration on top of the implant so that it blends into the remaining teeth.

Providing a dental restoration requires a rather complex workflow, which includes multiple impressions that have to be taken for re-creating the dental situation of the patient, in particular for designing the prosthesis of the tooth or teeth. This workflow also generally requires the involvement of several facilities such as a dental clinic and a dental lab.

In case of a denture that is supported on more than one implant, the difference in angle and insertion depth of these implants has also to be taken into account in order to provide optimum support for the dental restoration. In other words, there is generally work required to level any differences in height or angle between these implants so that loads acting on the dental restoration can be transferred equally efficient into the implants and the underlying bone tissue.

One approach to solve these problems is a high degree of customization. For example, after implantation, the dental restoration may be milled from one piece based on scans of the patient's teeth. However, these solutions generally require expensive CAD/CAM machinery.

Another approach is to use modular systems, which include some kind of spacer that can be placed in between an implant and a dental restoration in order to level any differences in height and/or orientation. However, these systems generally require a high number of different parts to be available that may have to be still adapted by hand in the presence of the patient with the aforementioned drawbacks.

In this respect, it was the objective of US 2008/0241790 A1 to compensate for minor misalignments and misplacements due to production tolerances. The proposed system basically uses a segmented element such as a ball that is placed between the head of an implant screw and an implant so that by tightening the screw, the segmented element gets compressed and deforms outwards. This causes the element to press against the inside of a sleeve, which in turn carries a dental restoration. However, this results in the dental restoration being held by a friction fit that bears the risk of a long term displacement or loosening of this restoration. Also, the deformation is equally applied in the circumferential direction of the segmented ball so that this technique does not resolve any misplacements of the dental implant within the bone tissue of a patient.

SUMMARY OF THE INVENTION

The above-noted challenges have been approached by the inventors of the present invention on the basis of several objectives. One of these objectives was to eliminate any misalignments and misplacements between a dental implant and a dental restoration. Another objective of the present invention was to provide a system that allows for a customized, i.e. passive, fit of the dental restoration but does not require highly individualized parts in order to build and properly support a dental restoration. Another aim of the invention was to simplify the workflow for creating a dental restoration and, in particular, reduce the chair time and any inconveniences to the patient during treatment.

The solution of the present invention addressing the aforementioned objectives and solving the underlying problems is defined by the appended independent claims and is described in the following in more detail. The dependent claims define additional features of further preferred embodiments.

In the following, the term misalignment is primarily used in relation to a difference in orientation between two components. For example, if two components have to be rotated in relation to each other to make them fit, they are considered to be misaligned. In contrast, the term misplacement is generally used in relation to a difference in position between two components, i.e. two components have to be translated to make them fit.

The terms adjustment, compensation or offset in relation to a misalignment or misplacement between a dental implant and a dental component generally refer to an adjustment that generally cannot be compensated by standard components used in the art.

More specifically, the present invention provides a connection assembly for attaching a dental component to a dental implant or a dental implant analogue, wherein the connection assembly is removably attachable to the dental implant or dental implant analogue, preferably with the dental component attached to the connection assembly. Further, the dental component is attachable to the connection assembly in a pre-fastened state or a fastened state, wherein in the pre-fastened state, while the connection assembly is attached to the dental implant or dental implant analogue, the connection assembly allows for adjustment of a relative position and/or orientation between the dental component and the dental implant or dental implant analogue, and wherein in the fastened state, the relative position and/or orientation between the dental component and the connection assembly is fixed, while the connection assembly is in particular detachable from the dental implant or dental implant analogue with the dental component attached to the connection assembly in the fastened state.

Basically including the feature of a pre-fastened state besides a fastened state between a dental component and the connection assembly allows to provide the dental component in a preassembled and optionally sterilized package to a patient. Thus, one of the main drawbacks of multicomponent systems, i.e. requiring assembly steps in the presence of the patient, has been successfully eliminated.

One further advantageous effect of the pre-fastened state is its presence while the connection assembly is attached to a dental implant or a dental implant analogue. Due to this, the pre-fastened state allows for an adjustment of the position and/or orientation between an implant and a dental component by attaching the dental component with the connection assembly in between. Once attached, the transition from the pre-fastened state into the fastened state can lock the adjustment. In other words, after the adjustment of the orientation and/or position has taken place, transferring the connection assembly into the fastened state "records" the adjustment.

Since the connection assembly is removably attachable to the dental implant or the dental implant analogue, the connection assembly fastened to the dental component can be removed from the dental implant or the dental implant analogue while keeping the aforementioned adjustment in place. This effectively provides any adjustment needed between the dental implant and a dental component so that a precise fit between the dental implant and the dental prosthesis is achieved at the end of treatment.

Independent of performing the adjustment of the dental component by means of the dental connection assembly in relation to a dental implant or a dental implant analogue, there is no need of creating dental impressions of the patient's dental situation. In case of a dental implant analogue, the position and orientation of a dental implant in the mouth of a patient can be recorded by a transfer abutment. Afterwards, a dental implant analogue is attached to each transfer abutment and the dental implant analogues are embedded in a moldable material. After the moldable material is set or cured, the transfer abutment is removed. As a result, the dental implant analogues of the working model represent the positions and/or orientations of the implants in the mouth of the patient.

The connection assembly of the present invention provides a two stage fastening technique for attaching a dental component to the dental implant or the dental implant analogue by functionally placing the connection assembly in between these items. Further, the attachment of the dental component to the implant is independent from locking the relative position and/or orientation between these items.

The adjustment of the relative position and/or orientation is basically achieved by providing an "adjustable through hole" to the dental component by means of the dental connection assembly. Said adjustable through hole of the dental connection assembly can e.g. be formed by a combination of components like washers having certain dimensions and bearing surfaces in relation to a through hole and bearing surfaces of the dental component. The connection assembly's adjustable hole can be tilted and positioned relative to the dental component or, more specifically, a through hole of the dental component in order to adapt to the placement of an implant within the oral cavity of a patient. For the through hole of the connection assembly to be adjustable, i.e. to be able to be tilted and translated, the through hole of the dental component has dimensions that are larger than needed for only inserting an implant screw in order to fasten the dental component to an implant.

In a preferred embodiment, the connection assembly further comprises an apical bearing means arranged apically of the dental component, wherein the apical bearing means is in particular formed by a second washer, and/or coronal bearing means arranged coronally of the dental component, wherein the coronal bearing means is in particular formed by a first washer and/or a third washer.

The bearing means of this embodiment provides a bearing surface that supports the positioning and orientation of the connection assembly or connection assembly's through hole. More specifically, the bearing surface, on the one hand, establishes contact and supports other parts of the connection assembly, the dental component or the implant and, on the other hand, constitutes a movable mouth of the adjustable assembly's through hole. Thus, the bearing means allows for the positioning of the mouth in a way that has previously only been possible with the individual design of a highly customized dental component.

An easy and preferred way to provide the bearing means is in the form of a washer. The washer is movable in relation to the dental component's through hole so that it can be optimally placed according to the relative position and/or orientation between the dental implant or dental implant analogue and the dental component. Also, the washer allows for the through hole of the dental component to have a larger cross-section than is required for inserting a dental screw, which provides the space needed for a sufficient range of adjustment. As a result, the range of adjustment only depends on the dimensions of the dental component and the parts of the connection assembly in engagement at intended use with the dental component, but not on the dimensions of other items such as a screw head having a size that only allows a through hole in the dental component to be of a certain size so that sufficient support of the screw is maintained.

In case of including only one bearing means, this bearing means mainly allows for an angular alignment of the connection assembly's through hole to offset any misalignment between the dental component and the implant. Nonetheless, repositioning can be enhanced by appropriately choosing the cross section of the dental component's through hole and/or the geometry of the bearing surface.

In a particularly preferred embodiment, the connection assembly further includes a fastening element, wherein the fastening element comprises an apical and/or coronal bearing surface, a through hole, and preferably an attachment mechanism for engaging the dental implant or the dental implant analogue in a detachable manner. The connection of this embodiment also includes an engaging element to fasten the dental component to the fastening element, wherein the engaging element is in particular chosen from at least one of the following: a first temporary screw, wherein the first temporary screw is formed such that it does not engage the dental implant or dental implant analogue and is formed for engaging the through hole, an adhesive, and a thermosetting resin.

The fastening and engaging elements are one advantageous way to provide for the pre-fastened and fastened state acting between a dental component and the connection assembly according to the invention. Preferably, the engagement between the fastening element and the engaging element is achieved by a threaded engagement. In order to establish the fastened state, the engaging element preferably only engages the fastening element but does not engage any part of the dental implant or dental implant analogue. This might simply be achieved by choosing a length of the engaging element so that it does not get in contact with the dental implant or dental implant analogue. The fastening element is preferably placed between the dental implant or dental implant analogue and the dental component.

Since the fastening element has a bearing surface, it may also act like a washer of the previous embodiment. Thus, it serves two functions, namely the functions of a removable bearing means and of a pre-fastened and fastened state between a dental component and the connection assembly. The bearing surface of the fastening element may be designed to allow for translation and/or rotation in respect to the dental component. The contact between the fastening element's bearing surface and another bearing surface facing said surface can be a contact at multiple points, a line contact or a surface contact.

The provision of an attachment mechanism that provides a temporary attachment of the connection assembly to the implant allows for a better compensation of any relative misalignment and/or misplacement between the dental component and the implant or dental implant analogue without the presence of play that may otherwise still be present if the connection assembly would be only placed on the dental implant or dental implant analogue without being attached. In other words, the attachment mechanism provides a defined connection between the dental implant or dental implant analogue and the connection assembly, which allows for a better correction of a misalignment and/or a misplacement between the dental implant or dental implant analogue and the dental component.

In another preferred embodiment of the present invention, the connection assembly comprises at least one washer to be interposed between the dental component and a screw head of the first temporary screw or the coronal bearing surface of the fastening element, wherein the fastening element is placed on the apical side of the dental component.

This preferred embodiment allows in particular for the compensation of any misalignment between the dental implant or dental implant analogue and the dental component. In other words, the at least one washer of this embodiment renders the connection assembly's through hole particularly adjustable to be aligned with the longitudinal axis of the implant or implant analogue or the longitudinal axis of the implant's or implant analogue's fastening means, which is generally constituted by a threaded hole. As already mentioned above, the compensation of a misalignment or misplacement can be enhanced with a corresponding design of the bearing surfaces between the connection assembly and the dental component.

In case that the coronal bearing surface of the fastening element faces the dental component, it is preferably configured to offset differences in orientation between the dental implant or dental implant analogue and the dental component. Consequently, the connection assembly's hole is tilted around the portion, in which the coronal bearing surface of the fastening element and the apical surface of the dental component are in contact. This results in a displacement of the mouth of the assembly's hole on the dental component's coronal side. By placing the washer on the coronal surface of the dental component and, thus, allowing the mouth of the assembly's hole to be movable, the aforementioned displacement can be offset.

In yet another embodiment of the invention, the washer comprises two bearing surfaces situated on opposite sides of the washer, at least one of the bearing surfaces being a flat bearing surface.

The flat bearing surface is particularly advantageous for translating the mouth of the assembly's hole in respect to the dental component's coronal and/or apical surface. The bearing surface opposite to the aforementioned flat bearing surface is preferably curved and more preferably spherical in order to account for any misalignments between the dental component and the dental implant or dental implant analogue.

In another particularly preferred embodiment, the connection assembly comprises a third washer to be arranged apically of the screw head, having an apical bearing surface, a coronal surface, a through hole for a screw, in particular a dental screw or the temporary screw, the through hole extending from the coronal surface to the apical bearing surface.

This embodiment has the advantage that there is no change in design of the dental screw or implant screw necessary since the third washer can provide an optimum support to the screw head. For example, if there is a misalignment present so that the apical support surface of the screw head is tilted in respect to the coronal side of the dental component, the third washer can be configured to offset this discrepancy by having a curved, preferably spherical apical bearing surface.

The through hole of the third washer is dimensioned so that the dental screw can be smoothly inserted. Consequently, the through hole of the third washer is smaller in diameter than the through hole of the dental component since any adjustment takes place between the apical bearing surface of the third washer and the coronal side of the dental component or the coronal side of a first washer. In the latter case, the first washer preferably has a through hole with a diameter in the range of the dental component's through hole. It can also be larger or smaller but is preferably larger than the through hole of the third washer.

In another embodiment of the present invention, the connection assembly comprises a first washer to be interposed between the dental component and the apical bearing surface of the third washer and/or a second washer to be interposed between the dental component and the coronal bearing surface of the fastening element.

The first washer of this embodiment allows for compensation of a translational offset on the coronal side of the dental component. As described above, the third washer may offset a misalignment between the support surface of the implant screw in relation to the coronal side of the dental component. The second washer of this embodiment offsets a misplacement of the dental implant or dental implant analogue in relation to the dental component and, preferably, also compensates for a misalignment between the dental implant or dental implant analogue and the apical surface of the dental component.

In combination, the first washer and the second washer can efficiently facilitate the adjustment of a misalignment and misplacement between the dental component and the dental implant or dental implant analogue. More specifically, the combination of the fastening element and the second washer on the apical side of the dental component allow for an offset of a misalignment and/or misplacement on the apical side of the dental component, whereas the combination of a first washer and third washer on the coronal side of the dental component may offset a misalignment and/or misplacement on the coronal side of the dental component, i.e. between the apical support surface of the screw head and the coronal surface of the dental component.

In yet another preferred embodiment, the contact between the first washer or a coronal side of the dental component and the apical bearing surface of the third washer is configured to be a surface contact, preferably established by spherical bearing surfaces.

A surface contact has the advantage of an optimum support between bearing surfaces such as between the apical bearing surface of the third washer and the coronal bearing surface of the first washer or the coronal side of the dental component. Spherical bearing surfaces particularly have the advantage that they provide support despite of any misalignment present between the dental component and the third washer.

In another particularly preferred embodiment, the contact between the second washer or an apical side of the dental component and the coronal bearing surface of the fastening element is configured to be a surface contact, preferably established by spherical bearing surfaces.

This particularly preferred embodiment has the same advantages in relation to the contact of the bearing surfaces as the ones listed for the previous embodiment.

In another embodiment of the present invention, the connection assembly comprises an implant screw, wherein the implant screw is formed for engaging the dental implant or dental implant analogue to fasten the connection assembly to the dental implant or dental implant analogue.

The implant screw engages the implant or implant analogue in order to fasten the connection assembly and the dental component to the dental implant or dental implant analogue, preferably without engaging the fastening element of the connection assembly. In other words, the implant screw bypasses the fastening element of the connection assembly so that it does not engage the fastening element. However, due to the compression exerted by the implant screw, the connection assembly will be fixed in position.

In a further embodiment, the attachment mechanism is formed as a snap-mechanism, wherein the fastening element is in particular rotatable relative to a longitudinal axis of the dental implant or dental implant analogue when attached to the dental implant or dental implant analogue.

The snap mechanism of this embodiment allows for the detachable connection between the implant or implant analogue and the connection assembly. The connection can be established independently of the rotational position between the fastening element and the implant or implant analogue, i.e. there is no rotational restriction that may impede easy coupling of these components. This is particularly advantageous in case of more than one implant or implant analogue that has to be connected to the dental component.

In another embodiment of the present invention, the implant screw, the first temporary screw and/or the second temporary screw can be operated independently of the attachment mechanism.

This independence in adjustment and fixation between the dental component and the implant or implant analogue is advantageous since the recording of the position and orientation of the dental component in relation to the dental implant or dental implant analogue can be maintained even when the connection assembly and the dental component are detached from the implant or implant analogue.

More specifically, due to the attachment mechanism, the dental component can be attached to the implant or implant analogue without the need for a dental screw or implant screw. Once attached to the dental implant or dental implant analogue, the first temporary screw can be used to alter the connection assembly's state from the pre-fastened to the fastened state and vice versa.

The second temporary screw has a similar function compared to the implant screw, i.e. it engages the implant or implant analogue but not the fastening element for fastening the dental component to the implant or implant analogue.

In particular, the second temporary screw has a length extending beyond the coronal side of the dental prosthesis to be created on the dental component for facilitating the formation of a screw channel within the dental restoration.

Preferably, a length $L1$ of the implant-screw shaft is longer than a length $L2$ of the first temporary-screw shaft.

In the context of the present invention, a shaft of a screw, e.g. the implant-screw shaft or the first temporary-screw shaft, is understood to represent the part of the screw arranged apically of the respective screw head of the screw at intended use, wherein the apical side of the screw head is intended to rest on the coronal bearing surface of the first washer, the coronal side of the third washer or on the coronal side of the dental component.

Preferably, the engagement between the first temporary screw and the fastening element is established by threads.

In another preferred embodiment, the connection assembly comprises a bearing element, the bearing element comprising a through hole for insertion of an engaging element, such as a implant screw or first temporary screw, and at least one curved, preferably spherical, bearing surface, wherein at least a portion of the bearing element is located between the coronal side and the apical side of the dental component.

The bearing element is similar to a washer. However, it may comprise a bearing surface that extends continuously from the coronal side to the apical side of the bearing element or comprise more than two bearing surfaces, such as a flat bearing surface and a curved, preferably spherical bearing surface facing the apical direction and a flat bearing surface facing the coronal direction. Since at least a portion of the bearing element is located between the coronal side and the apical side of the dental component, it can provide a more compact design of the connection assembly.

Further, the invention provides a dental component for attachment to a dental implant or dental implant analogue comprising at least one through hole extending from an apical side to a coronal side of the dental component, the hole being adapted for an insertion of an implant screw, a first temporary screw or a second temporary screw, preferably of a dental connection assembly according to any one of the preceding claims.

The dental component of the present invention has holes that allow for compensation of a misalignment and/or misplacement that may be present between the dental implant or dental implant analogue and the dental component. Consequently, the at least one through hole of the dental component is dimensioned to accommodate the adjustable through hole of the connection assembly as described above.

The diameter of the through hole passing through the dental component in an apical-coronal direction has a larger cross-section or diameter than necessary to be able to insert an implant screw. More specifically, the largest dimension of a cross-section or a diameter of the dental component's screw hole is 20 to 300%, preferably 50 to 150%, and most preferably 75 to 125% larger than the diameter of the part of the implant screw located in the through hole while being fastened to the dental implant or dental implant analogue.

In a preferred embodiment of the dental component, one of the apical side and coronal side is a spherical bearing surface and the other of the apical side and coronal side is preferably a flat bearing surface.

This configuration of the dental component reduces the parts of the connection assembly needed for compensation of a misalignment and/or misplacement. It particularly enables an adjustment or correction of a misalignment between the dental implant or dental implant analogue and the dental component and may provide for an enhanced contact between the dental component and the dental implant or dental implant analogue.

Preferably, the dental component comprises two through holes and most preferably three through holes. The arrangement of exactly three through holes in the dental component for the dental connection assembly as described above has the advantage that a dental prosthesis can be safely supported by three connection assemblies attached to three dental implants or during creation of the prosthesis three dental implant analogues.

The present invention also provides a method for assembling a dental component to a connection assembly, which comprises providing a dental component having at least one through hole as well as providing a connection assembly comprising a fastening element, a first temporary screw for engaging a through hole of the fastening element to fasten the dental component to the fastening element, wherein the first temporary screw is formed such that it does not engage the dental implant or dental implant analogue, and in particular at least one washer. The method optionally includes at least one of a placement of a first washer on an apical or coronal side of the through hole, a placement of a third washer on the dental component or the first washer when placed on the coronal side of the through hole, and a placement of a second washer on the other side of the apical or coronal side of the through hole of the dental component. The method also comprises engaging the fastening element with the first temporary screw so that the fastening element and the first temporary screw are movable relative to the through hole of the dental component.

This method applies the above-mentioned advantages of the present invention's connection assembly. In particular, the application of aforementioned method realizes a connection assembly, which is preassembled to a dental component. Thanks to the pre-fastened state, the next step can already be the compensation of the orientation and/or position of the dental component in relation to the dental implant or dental implant analogue by adjusting the connection assembly. In other words, the through hole defined by the connection assembly is tilted and/or positioned according to the difference in orientation and/or positioning of the dental component in relation to the dental implant or dental implant analogue.

This method may also comprise the placement of a bearing element at least partly within the through hole of the dental component. This provides bearing surfaces that interact inside the dental component instead on its coronal or apical side. As a result, the connection assembly can be reduced in size.

Due to the preassembly of the present invention's connection assembly, the next step can already be the recording of the position and orientation of the implant or implant analogue in relation to the dental component. Even if the pre-assembly takes place at a dental clinic, it is not necessary for the patient to be present.

In a preferred embodiment, the method comprises the step of providing the fastening element with an attachment mechanism for engaging a dental implant or a dental implant analogue in a detachable manner.

The attachment mechanism of the fastening element engages the dental implant or dental implant analogue in order to provide a certain amount of fixation. This fixation may be provided as a form-fit and/or a friction fit. In particular, the attachment mechanism provides a defined attachment of the fastening element to the dental implant or dental implant analogue.

The invention also presents a method for adjusting the position and/or orientation of a dental component relative to a dental implant or dental implant analogue using a connection assembly of the present invention. The method comprises mounting the dental component and the connection assembly on a dental implant or dental implant analogue, wherein the connection assembly comprises a fastening element and a first temporary screw. Preferably, the dental component and the connection assembly have been assembled applying the previously defined method. Further steps of this method are attaching the fastening element to the dental implant or dental implant analogue with an attachment mechanism for engaging the dental implant or dental implant analogue in a detachable manner, adjusting the position and/or orientation of the dental component relative to the dental implant or dental implant analogue by means of adjusting the connection assembly, and tightening the engagement between the first temporary screw and the fastening element to fix the position and/or orientation of the dental connection assembly relative to the dental component.

The recording of the position and orientation of the dental implant or dental implant analogue in relation to the dental component reduces the number of dental impressions necessary for making a dental restoration fit. In fact, any dental impressions after implantation can be avoided if the recording is performed within the mouth of the patient using the dental component including the connection assembly or a transfer abutment instead of a model of a patient's teeth derived from a dental impression. In the lab, the dental situation can also be easily reproduced based on the recorded position and orientation, i.e. by the connection assembly being in the fastened state or by the at least one transfer abutment. As will be appreciated by the skilled person, this method provides the same accuracy of fit as highly customized dental restorations without requiring the number of dental impressions needed for these restorations.

If a dental implant analogue is used, the steps of the method may be executed in absence of the patient at a dental clinic or in a dental lab. However, if recording is performed with the dental connection assembly directly in the mouth of a patient, the method steps for adjusting the position and/or orientation of a dental component will generally take place at the dental clinic.

In a preferred embodiment, the method comprises detaching the dental component and the dental connection assembly from the dental implant or the dental implant analogue by detaching the fastening element while retaining the position and/or orientation of the dental connection assembly relative to the dental component using the first temporary screw and/or affixing means, in particular a thermosetting polymer, preferably chosen from at least one of the following: wax, acrylic, resin.

Consequently, the relative position and/or orientation of the dental component can be maintained without the need of being attached to the dental implant or dental implant analogue. If an affixing means is used on the dental connection assembly while the first temporary screw is tightened to the dental implant or dental implant analogue, the first temporary screw may be removed, whereas the relative position and/or orientation of the dental component relative to the dental implant or dental implant analogue is maintained. As a result, the dental component including the dental connection assembly may be attached to the dental implant or dental implant analogue using, for example, an implant screw in order to verify the precise fit of this arrangement.

In another preferred embodiment, the method further comprises obtaining at least one transfer abutment, preferably two, even more preferably three transfer abutments, indicating the position and/or orientation of at least one dental implant. A working model is created by attaching an implant analogue to each transfer abutment and fixing the at least one implant analogue in a model, preferably by embedding the dental implant analogue in a moldable material.

This part of the method provides a model of the dental situation of a patient that can be used for adjusting the position and/or orientation of a dental component relative to a dental implant analogue as described above. This has the advantage that it can be controlled during the creation of the prosthesis as often as necessary without bothering the patient if the precise fit of the dental component in relation to the at least one implant analogue representing the at least one dental implant in the patient's mouth is still maintained.

In order to fix the at least one implant analogue in a model, the implant analogue is preferably embedded in a moldable material while this material is still in the liquid state. In other words, the implant analogue is immersed in this material before the material sets or cures and, thus, transfers to a solid state that keeps the at least one implant analogue in place. As moldable material, a resin or gypsum may be used.

If more than one transfer abutment is used, these transfer abutments are fixed in relation to each other while being installed on the respective dental implants of a patient. If only one transfer abutment is used, another point of reference is needed in order to record the position and/or orientation of the transfer abutment. This point of reference may be a partial dental impression that includes the transfer abutment as well as at least one adjacent tooth. Although in this embodiment of the method, a dental impression may be necessary, the dental impression only affects a small region of a patient's mouth, namely the adjacent tooth or teeth. Naturally, it may also be possible to provide the point of reference using a scan of the patient's dental situation instead of an impression.

In yet another preferred embodiment of the method, it further comprises fastening the connection assembly and the dental component to the dental implant analogue with a second temporary screw and producing the dental prosthesis on the basis of the dental component and the affixed dental connection assembly.

The use of the second temporary screw in order to attach the dental component including the connection assembly to the implant analogue facilitates the handling of the arrangement during the creation of a dental prosthesis. This applies for the manual handling as well as for the handling by machinery. Consequently, the efficiency in producing the dental prosthesis is enhanced.

In another preferred embodiment, the method comprises obtaining data about intraoral jaw relation records for a vertical dimension of occlusion and a centric relation as well as applying these records to an articulator for producing the dental prosthesis.

This embodiment enhances the production of the dental prosthesis further without increasing the chair time of the patient since the occlusion of the jaw and in particular the at least one antagonist of the dental prosthesis is accounted for so that any adjustments of the prosthesis after placing it in the patient's mouth are reduced to a minimum.

Further, the present invention provides a method for producing a dental prosthesis comprising the step of obtaining a dental component attached to a connection assembly in a fastened and adjusted state. The latter may have been achieved by the method previously described. Further, a fastening element of the connection assembly is fastened or attached to a dental implant analogue.

As already noted, the position and orientation recorded by the connection assembly according to the present invention can be easily used in a dental lab as a basis for creating the dental prosthesis. By attaching the fastening element to a dental implant analogue, preferably using the attachment mechanism, and afterwards fixing the position of the implant analogues, the recorded position and orientation is maintained. Thus, the first temporary screw can be removed and be replaced by a second temporary screw or an implant screw in order to continue with the normal workflow to build up a dental prosthesis.

A preferred embodiment of the method also comprises the step of fixing the position and/or orientation between the dental connection assembly relative to the dental component with affixing means, in particular thermosetting polymers, preferably chosen from at least one of the following: wax, acrylic, resin. Another step comprises removing the first temporary screw and fastening the connection assembly and the dental component to the dental implant analogue with a second temporary screw formed for engaging the dental implant or a dental implant analogue. Optionally the method also includes producing the dental prosthesis on the basis of the dental component and the affixed dental connection assembly.

In addition or as an alternative to the connection to implant analogues of the previous embodiment using the attachment mechanism, the position and orientation recorded by the connection assembly of the present invention is fixed or locked with aforementioned affixing means. Thus, there is no need to maintain the position and orientation provided by the connection assembly using the attachment mechanism and a fixation of the implant analogues. Instead, the first temporary screw may be removed after application of the affixing means and be replaced by a second temporary screw or an implant screw.

In a preferred embodiment, the method further comprises the optional step of removing the second temporary screw and the step of fixing the dental prosthesis to at least one dental implant implanted into the mandible or maxilla of a patient using an implant screw.

This step finalizes the treatment of a patient and provides a dental replacement using less chair time, mainly thanks to the precise recording of the orientation and position of the implant relative to the dental component with the support of the present invention's connection assembly.

The present invention also provides a method for producing a dental prosthesis, comprising the steps of providing a model of a dental situation of a patient comprising at least one dental implant analogue and providing a dental component, in particular a dental component as described above, and a connection assembly, in particular according to above, in a pre-fastened state by means of a first temporary screw. Further, the method comprises mounting the dental component and the connection assembly on the dental implant analogue, wherein, in particular, the dental component and the connection assembly were assembled with the method described above, adjusting the position and/or orientation of the dental component relative to the dental implant analogue by means of adjusting the connection assembly, and fastening the first temporary screw to fix the position and/or orientation of the dental connection assembly relative to the dental component.

In a preferred embodiment, the method further comprises detaching the dental component and the dental connection assembly from the dental implant analogue by detaching the fastening element while retaining the position and/or orientation of the dental connection assembly relative to the dental component, and applying affixing means for fixing the position and/or orientation of the dental connection assembly relative to the dental component so that the position and/or orientation of the dental connection assembly relative to the dental component is retained after removal of the first temporary screw, wherein the affixing means is preferably a thermosetting polymer, preferably chosen from at least one of the following: wax, acrylic, resin.

In another preferred embodiment, the method further comprises removing the first temporary screw and fastening the connection assembly and the dental component to the dental implant analogue with a second temporary screw formed for engaging the dental implant analogue, and producing the dental prosthesis on the basis of the dental component and the affixed dental connection assembly.

In yet another preferred embodiment, the method further comprises obtaining data about intraoral jaw relation records for vertical dimension of occlusion and centric relation, and applying these records to an articulator comprising the model of the dental situation, the dental component, and the dental connection assembly for producing the dental prosthesis.

This method and its preferred embodiments is advantageously applicable in a dental lab since none of the steps require the presence of the patient, the dental prosthesis is meant for. It also combines the advantages already described above.

All the embodiments of the present invention have the advantage that they allow for an easy integration into existing workflows for creating a dental prosthesis.

A dental component may be any dental component used in the art in order to build up a dental prosthesis. Preferably, the dental component is a superstructure such as an abutment for an individual tooth or a bridge for three or more teeth fixed with two to three implants. More preferably, the dental component is formed as a bar for the treatment of fully edentulous situations, wherein the bar can be preferably fixed with three, four or five implants. The dental component may be an off the shelf product, in particular a pre-fabricated and non-individualized product.

SHORT DESCRIPTION OF THE DRAWINGS

The following description of the present invention's preferred embodiments may be best understood by taking the accompanying drawings in consideration. Within the figures of these drawings, same reference numerals are used for features that are identical or have an identical or similar function. In the following a short description will summarize the content of these figures.

DESCRIPTION OF PREFERRED EMBODIMENTS

Figure 1:
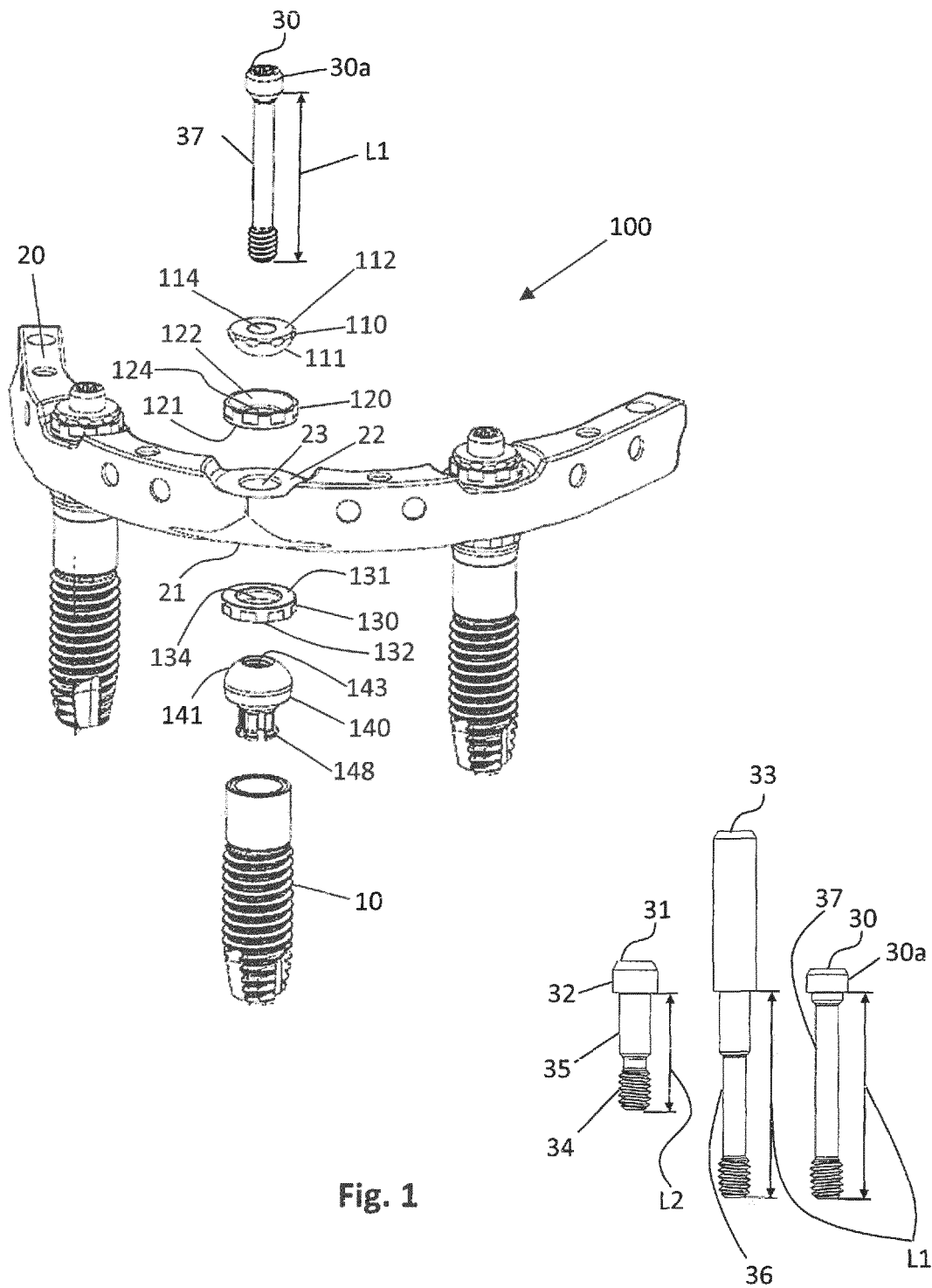
FIG. 1 shows an exploded view of an implant, a dental component and a connection assembly according to the present invention.

FIG. 1 shows a dental component 20, dental implants 10 and connection assemblies 100. FIG. 1 also shows a dental screw or implant screw 30. The configuration of a dental implant 10, the connection assembly 100 and a dental screw 30 is also shown as exploded view for explanation of the configuration and interaction between the aforementioned components.

In the lower right of FIG. 1, two additional screws 31, 33 are illustrated for use with the connection assembly 100. More specifically, FIG. 1 additionally shows a first temporary screw 31 having a first temporary-screw shaft 35 with a length L2 and a second temporary screw 33 having a second temporary-screw shaft 36 with a length similar to the length L1 of an implant-screw shaft 37 of the dental screw 30. As illustrated in FIG. 1, the length L2 of the first temporary-screw shaft 35 of the first temporary screw 31 is less than the length L1 of the second temporary-screw shaft 36 of the second temporary screw 33. The difference in length has been chosen on the basis of the components these screws are intended to engage with, i.e. the first temporary screw is configured for an engagement with the connection assembly's fastening element 140, whereas the second temporary screw 33 is configured for an engagement with the dental implant 30, as will be described in more detail below.

It should be noted that, as described above, the dental implant 30 may be replaced by a dental implant analogue (not shown) depending on the method and the step of the method. More specifically, whenever a step is performed that does not necessitate the presence of a patient, a dental implant analogue instead of an implant may be used. This particularly applies if and model reflecting the dental situation of a patient is used during the step of the treatment in order to create a dental prosthesis.

The dental component 20 shown in FIG. 1 is intended for building up a dental prosthesis of a whole denture for replacement of the teeth in the mandible or maxilla. In order to provide efficient support for the dental prosthesis, the dental component 20 is attached to three implants 10. Nonetheless, as will be appreciated by the skilled person, the dental component 20 may, on the one hand, also be intended for a connection with more than three implants, such as four or five implants or, on the other hand, may be intended to be supported by two implants 10 for creating a dental bridge. This is simply achieved by adapting the size of the dental component and the number of through holes. A connection assembly according to the invention can also be used together with a dental component 20 such as an abutment, which is supported by only one implant 10 in order to create a dental prosthesis for the replacement of a single tooth.

As illustrated in the exploded part of the view shown in FIG. 1, the connection assembly 100 comprises multiple parts or components. A first washer 120 having an apical bearing surface 121 and a coronal bearing surface 122 is placed to be in contact with the coronal side 22 of the dental component 20. In the illustrated exemplary embodiment, the apical bearing surface 121 is basically formed by a flat surface, which facilitates, as already mentioned above, translations parallel to the coronal side or coronal bearing surface 22 of the dental component 20.

The bearing surface 122 situated on the opposite side to the flat bearing surface 121 is curved or spherical. This spherical bearing surface interacts with an apical bearing surface 111 of a third washer 110 placed coronally of the first washer 120. Said bearing surface 111 preferably has a shape that corresponds to the bearing surface 122 of the first washer 120. In the illustrated example, the bearing surface 122 is spherical just like the apical bearing surface 111 of the third washer. They preferably correspond to each other in order to provide a surface contact as previously described.

The interaction between the apical bearing surface 111 and the coronal bearing surface 122 allows for a compensation of a misalignment between the apical support surface of the implant screw's head 30a and the coronal support surface 112 of the third washer 110. In other words, if the dental screw is inserted into and tightened to the implant 10 in a direction that deviates from the orthogonal direction to the coronal side 22 of the dental component 20, the interaction between the first washer 120 and the second washer 110 offsets the difference in alignment between the coronal side 22 of the dental component 20 and the apical support surface of the screw's head 30 by tilting the third washer 110 relative to the first washer 110. The same applies if either one of the first temporary screw 31 or the second temporary screw 33 is used instead of the dental screw 30.

As illustrated in FIG. 1, the through hole 114 passing through the third washer 110 has a diameter that is sufficient for the shaft 34 of implant screw 30 to pass through and is yet small enough to provide sufficient support to the apical support surface of the screw's head 30a. In contrast, the through hole 122 of the first washer 120 is larger in diameter than the through hole 114 of aforementioned third washer 110 since it has to provide sufficient space for the dental screw 30 and the third washer 110 to be tilted therein. The same applies to the through hole 23 extending from the coronal side 22 to the apical side 21 of the dental component 20, i.e. it is larger in diameter than the through hole 114 of the first washer 110 in order to allow for compensation of a misalignment and/or misplacement of the apical support surface of dental screw's head 30 and the coronal surface 22 of the dental component 20 caused by a misalignment and/or misplacement between the dental implant 10 and said component 20.

On the apical side 21 of the dental component 20, a flat bearing surface 21 is provided facing the opposite direction compared to the bearing surface 22 of the dental component's coronal side. The apical side 21 of the dental component 20 is to be in contact with a flat bearing surface 131 of the first washer 130. In the exemplary embodiment illustrated in FIG. 1, the first washer 130 has basically the same configuration as the first washer 120 placed to be in contact with the coronal side 22 of the dental component 20. Naturally, the configuration may well differ, for example by using a different curvature or radius for the apical bearing surface 132. As illustrated in FIG. 1, the second washer 130 is arranged mirror-inverted to the first washer 120.

The curved and in particular spherical bearing surface 132 on the apical side of the second washer 130 is arranged to be in contact with a coronal bearing surface 141 of a fastening element 140. Accordingly, the fastening element 140 is provided on the apical side of the second washer 130. As previously described in relation to the contact of the first washer 130 with the third washer 110, the coronal bearing surface 141 and the apical bearing surface 132 also preferably correspond to each other in order to achieve surface contact as described above. Consequently, these bearing surfaces may compensate for any misalignment of the implant 10 in relation to the dental component 20.

The fastening element 140 has a through hole 143 similar to the one of the third washer 110. However, the through hole 143 is provided with a fastening means, preferably an inner thread, that interacts with an outer thread 34 of the first temporary screw 31. The interaction between the outer thread 34 of the first temporary screw 31 and the inner thread 143 of the fastening element 140 enables the assembly of the third washer 110, the first washer 120, the dental component 20, the second washer 130 and the fastening element 140 in the pre-fastened and fastened state as already described above. In other words, the first temporary screw 31 acts as an engaging means for the fastening element 140. On the one hand, if the first temporary screw 31 is not tightened but merely holds the aforementioned components together so that they may move relative to each other, the connection assembly 100 is provided to the dental component 20 in the pre-assembled state (cf. FIG. 3). On the other hand, if the first temporary screw 31 is tightened, the connection assembly 100 is provided to the dental component 20 in the aforementioned fastened state (cf. FIG. 4).

In the pre-fastened state, the connection assembly 100 allows for any of the screws 30, 32, 33 to be translated in a direction transverse to the longitudinal axis of the through hole 23 located in the dental component 20 as well as to be tilted so that the longitudinal axis of said screw is arranged in an angle to the longitudinal axis of the through hole 23. This balances any misplacement and/or misalignment and provides optimum support between the dental component 20 and the dental implant 10.

In other words, the connection assembly 100 defines an adjustable through hole within the through hole 23 of the dental component 20 that may be tilted and translated in order to compensate for a difference in orientation and position between the implant 10 and the dental component 20. The through hole of the exemplary connection assembly 100 in FIG. 1 is defined on the coronal side by the through hole 114 of the third washer 110 and on the apical side by the through hole 143 of the fastening element 140.

While one of the screws 30, 31 and 33 is tilted within the through hole 23 of the dental component 20, the bearing surface 111 of the third washer 110 rotates accordingly against the bearing surface 122 of the first washer 120 and the coronal bearing surface 141 rotates against the apical bearing surface 132 of the second washer 130.

The tilting movement, which compensates for a misalignment between the implant 10 and the dental component 20, also requires a translation or displacement of at least one of the washers 120, 130 of the coronal side 22 and the apical side 21. More specifically, the tilting requires at least a translational movement of the first washer 120 if the point of rotation is lying within the apical surface 21 of the dental component 20 and vice versa. However, in general, the tilting of the screw 30, 31 or 33 requires a translational movement of both the first washer 120 and the second washer 130 due to the design of the connection assembly. It will be appreciated by the skilled person that the translational movement between the washers 120 and 130 and the coronal side 22 and the apical side 21, respectively, takes place between the bearing surfaces 121 and 22 as well as between the bearing surfaces 131 and 21.

In addition or as alternative to the compensation of a misalignment by aforementioned tilting and translation, there may be a compensation of a misplacement required. If a compensation of a misalignment is performed, the translation basically superimposes the translation caused by the inclination of aforementioned screws in relation to the dental component 20.

The fastening element 140 shown in FIG. 1 also comprises an attachment mechanism at its apical end. The attachment mechanism enables the attachment of the fastening element 140 to the implant 10. Preferably, the attachment mechanism 148 is designed as a snap-mechanism that provides a detachable attachment of the fastening element 140 to the dental implant 10 or a dental implant analogue. The dental implant 10 preferably comprises features that correspond to the attachment mechanism 148 of the fastening element 140. For example, in case of the snap-mechanism 148 shown in FIG. 2, the dental implant 10 may comprise an inner circumferential groove with which the snap-mechanism engages.

The attachment mechanism 148 provides a way of attachment between the dental component 20 and the implant 10, which does not involve any screws. In other words, the attachment by the connection assembly 100 is independent from any screws.

Figure 8:
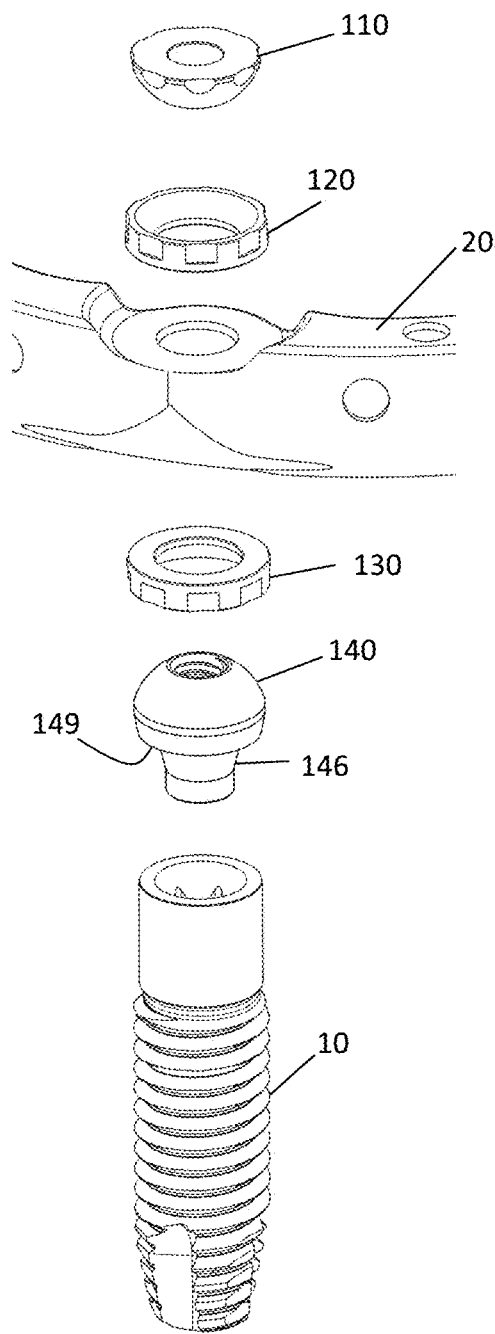
FIG. 8 shows a partial exploded view of a dental component, a connection assembly and a dental implant as illustrated in FIG. 1, except for a different embodiment of the fastening element.

In the embodiment shown in FIG. 8, the fastening element 140 is attached to the dental implant 10 or the dental implant analogue using a form fit. In contrast to the snap-mechanism illustrated in FIG. 1, the attachment in FIG. 8 is not dependent on an elastic bending and release of a portion of the fastening element 140 that results in a form-fit. Instead, the fastening element 140 shown in FIG. 8 engages the dental implant 10 or a dental implant analogue by snuggly fitting into the implant 10 or implant analogue. Naturally, the fastening element 140 may snuggly fit into and/or onto an implant or an implant analogue depending on the interface of a dental implant or implant analogue that is used for its attachment.

In FIG. 8, the fastening element 140 comprises an engagement surface 146. The engagement surface 146 is a conical surface that tapers from its coronal end to its apical end. It engages at least partly a corresponding surface of the dental implant 10 or dental implant analogue. This is particularly visible in the cross-sectional views in FIGS. 9 and 10. In these figures, the engagement surface 146 of the fastening element 140 is in contact with a corresponding surface of the dental implant 10 or dental implant analogue. Like the fastening element 140 having the snap-mechanism 148, the fastening element 140 of FIG. 8 to preferably comprises an apical facing stop surface 149 that is in contact with a coronal facing surface of the dental implant 10 or dental implant analogue. This stop surface 149 provides for a defined position of the fastening element 140 in relation to the dental implant or dental implant analogue in the apical-coronal-direction.

Nonetheless, the connection assembly 100 is transferred to the fastened state in respect to the dental component 20 by means of an engaging element as detailed above in order to record a difference in orientation and/or placement of the dental component 20 in relation to the dental implant 10 or dental implant analogue. More specifically, the difference is recorded by the relative position and orientation among the individual components of the connection assembly 100 as well as their orientation and position relative to the dental implant 10 or dental implant analogue and the dental component 20. Preferably, the engaging element is the aforementioned first temporary screw 31 but can also be any of the other means listed above. Further, as the skilled person will appreciate, the fastened state can also be achieved by tightening the dental screw 30 or the second temporary screw 33. However, they do not allow for a recording of the orientation and position of the connection assembly since they do not engage with the fastening element 140 but only with the dental implant 10 or dental implant analogue.

Figure 2A:
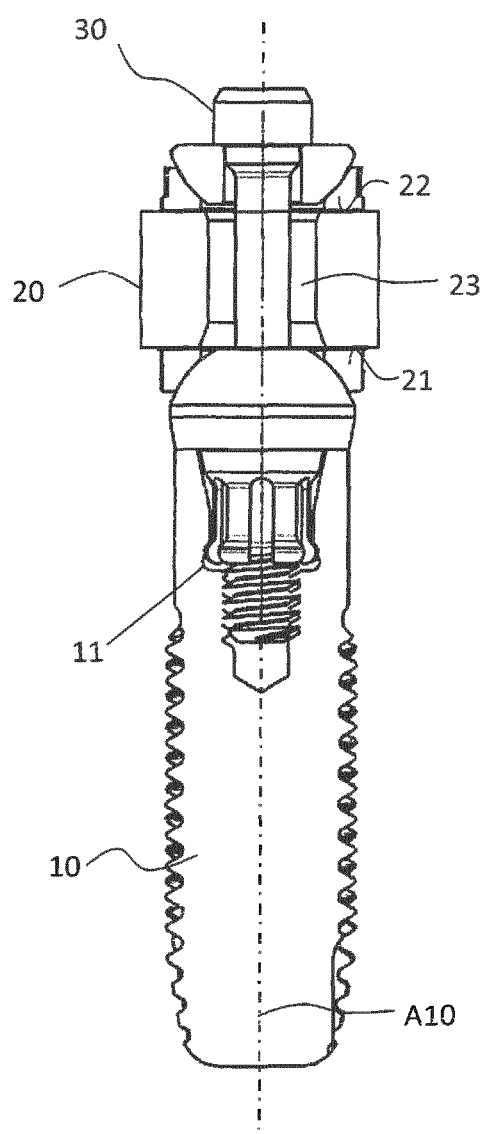
FIG. 2a shows a connection assembly and a dental component attached to an implant with an implant screw, wherein there is no misalignment or misplacement between the dental implant and the dental component.

FIG. 2a is a cross-sectional view with an implant screw 30 that mounts a dental component 20 to a dental implant 10 by means of a connection assembly 100. In the configuration shown in FIG. 2a, there is no misalignment or misplacement between the dental component 20 and the dental implant 10, i.e. the dental component 20 and the dental implant 10 are in a neutral position. Consequently, the washers 110, 120 and 130 as well as the fastening element 140 are centered around the longitudinal axis A10 of the dental implant 10 and the longitudinal axis of the dental component's through hole 23.

Figure 2B:
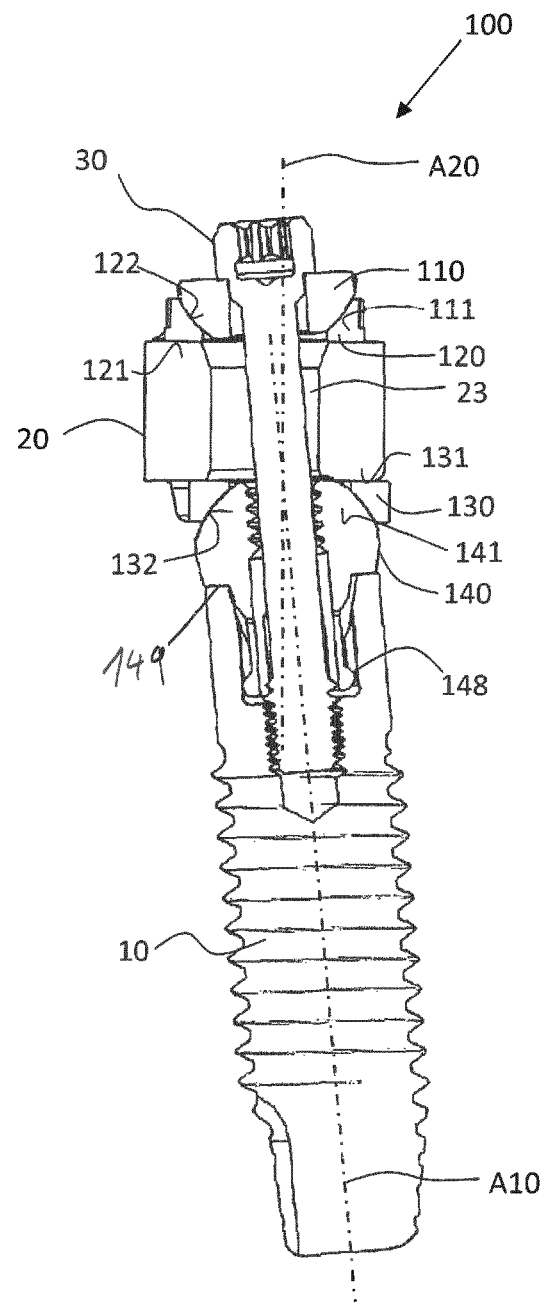
FIG. 2b shows a connection assembly and a dental component attached to an implant with an implant screw, wherein the connection assembly compensates for a misalignment between the dental implant and the dental component.

Turning to FIG. 2b, a misalignment is shown between the implant and the dental component 20 so that the longitudinal axis A10 of the implant and the longitudinal axis A20 of the dental component's through hole 23 form an angle in respect to each other. Without the compensating effect of the connection assembly 100, this misalignment would result in a poor support or contact between the implant 10 and the dental component 20; alternatively or in addition, tension might be introduced into the dental implant 10, dental component 20 or connection assembly 100. However, since the connection assembly 100 is able to compensate such a misalignment by a rotational movement between the third washer 110 and the first washer 120 as well as between the fastening element 140 and the second washer 130, the apical support surface of the dental screw's head 30*a* rests flat on the bearing surface 112 of the third washer 110. The same applies to the connection between the coronal side of the dental implant 10 and the apical side of the dental component 20 due to the parts of the connection assembly 100 sandwiched and adjusted therebetween.

Figure 9:
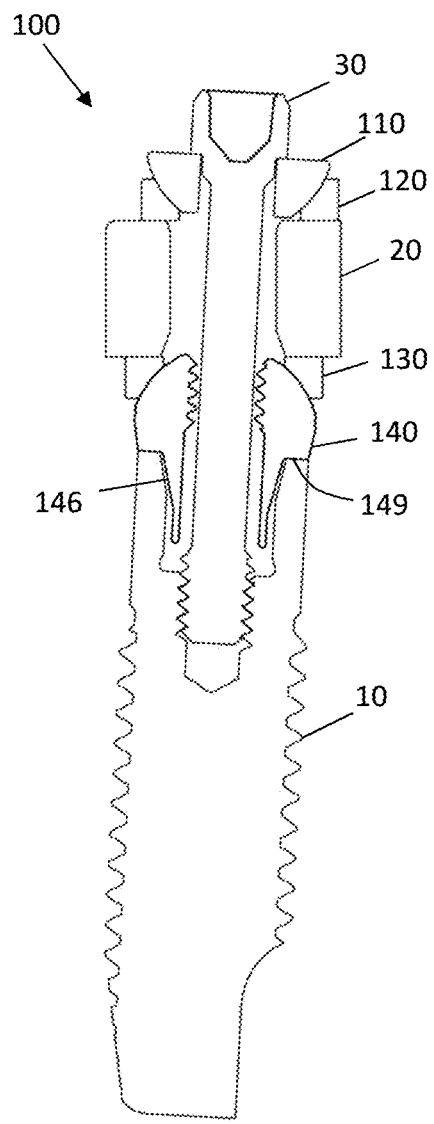
FIG. 9 shows the embodiment of a dental component, a connection assembly and a dental implant as illustrated in FIG. 8 in an assembled fastened state using a dental screw.
Figure 10:
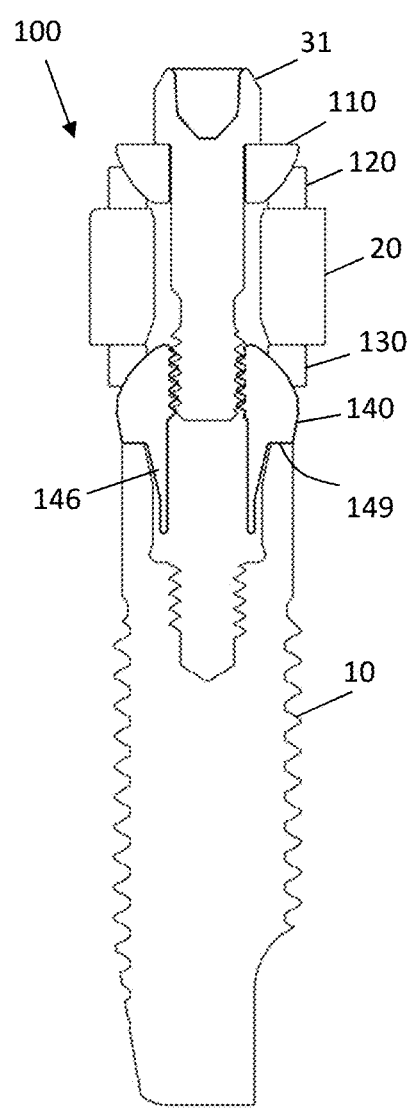
FIG. 10 shows the embodiment of a dental component, a connection assembly and a dental implant as illustrated in FIG. 8 in an assembled fastened state using a first temporary screw.

As also illustrated in FIG. 2*b*, the compensation of the misalignment between the dental component 20 and the dental implant 10 also requires a translation. The translation occurs between the apical flat surfaces of the first washer 120 and the coronal side 22 of the dental component 20 on the one hand and between the flat surfaces of the bearing surface 131 of the second washer 130 and the apical side 21 of the dental component 20 on the other hand. The same is illustrated in FIG. 9 for a fastening element 140 with an engagement surface 146 to engage and implant 10 or an implant analogue.

FIG. 2 illustrates how the connection assembly 100 defines an adjustable through hole that is situated in the through hole 23 of the dental component 20. As already explained in more detail above, the hole 23 of the dental component 20 has a size to allow for the compensation of a misalignment and/or misplacement between the dental component 20 and the dental implant 10. Naturally, the dental implant 10 in FIG. 2 may be instead a dental implant analogue.

Figure 3:
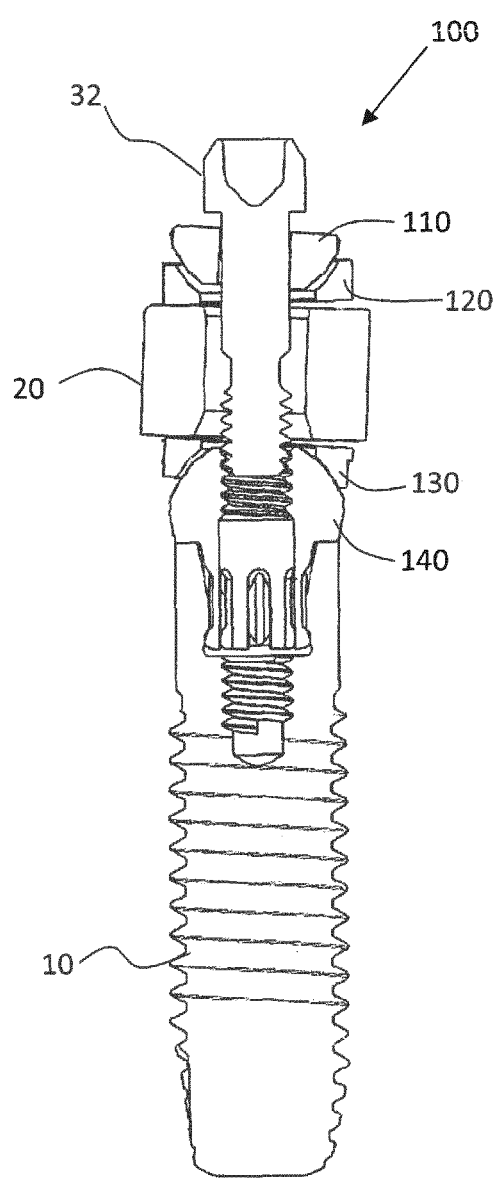
FIG. 3 shows a connection assembly and a dental component with a first temporary screw in a pre-fastened state.

FIG. 3 shows a connection assembly 100 attached to a dental component 20 and maintained in a pre-fastened state by an engaging element in the form of the first temporary screw 31. In this pre-fastened state, the longitudinal axis of the first temporary screw 31 can be translated and tilted in the range provided by the dimension of the through hole 23 in order to compensate for any misalignment or misplacement between the dental component 20 and the dental implant 10.

Figure 4:
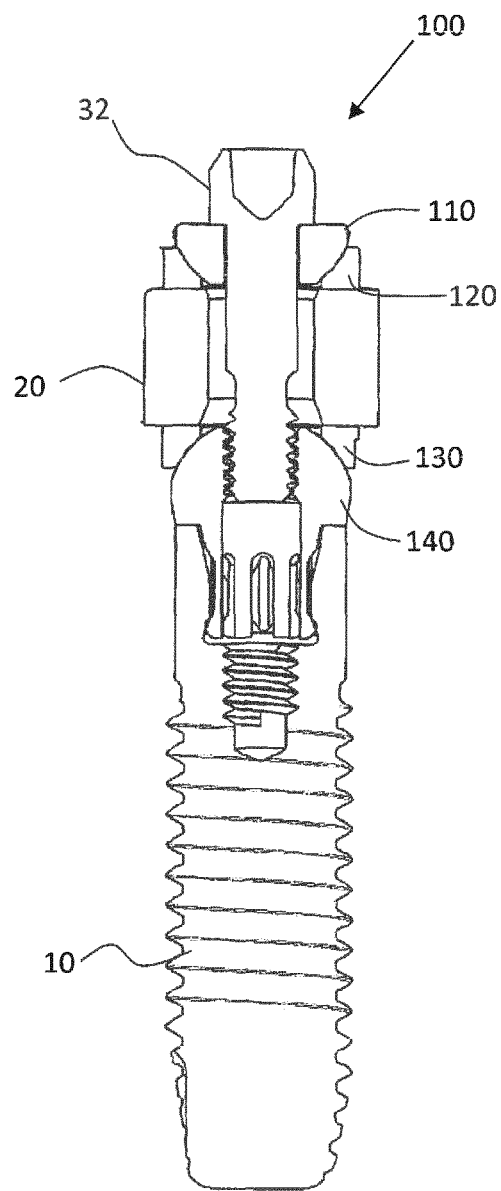
FIG. 4 shows a connection assembly and a dental component with a first temporary screw in a fastened state.

As illustrated in FIG. 4, tightening the first temporal screw 31 locks the orientation and position of the adjustable through hole defined by the connection assembly 100. In both FIG. 3 and FIG. 4, the connection assembly 100 is attached to the dental implant using the aforementioned attachment mechanism 148. As already explained, the first temporary screw 31 only engages the fastening element 140. There is no interaction with the dental implant 10. Depending on the method used for creating a dental prosthesis, the implants in FIGS. 3 and 4 may be substituted by a dental implant analogue which is part of a model representing the dental situation of a patient.

Figures 5A, 5B:
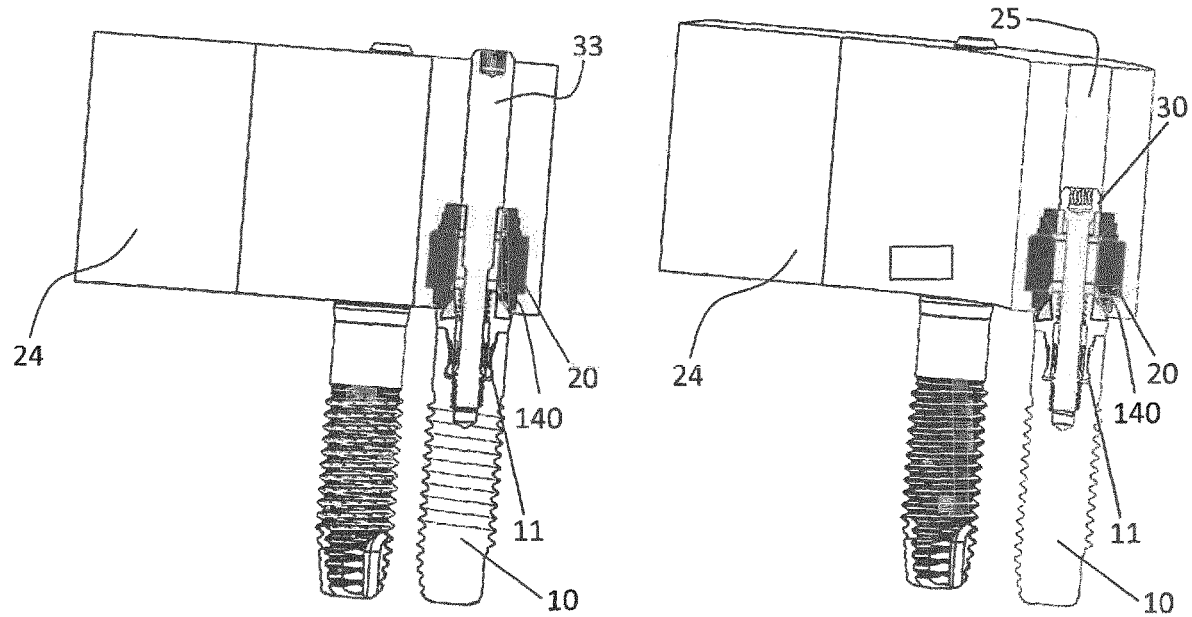
FIG. 5a shows a connection assembly attached to an implant analogue, wherein a dental prosthesis is created on top of the dental component using a second temporary screw.
FIG. 5b shows a connection assembly, wherein a dental screw is used to attach the dental prosthesis to the implant or implant analogue using an implant screw.

FIG. 5*a* shows a connection assembly 100 attached to a dental component 10 using a second temporary screw 31 instead of the first temporary screw 31 shown in FIGS. 3 and 4. As can be taken from FIG. 5*a*, the long head of the second temporary screw 33 serves as a negative form for creating a screw channel 25 within the material of a dental prosthesis (cf. FIG. 5*b*), for example by applying wax-up techniques. During the creation of the dental prosthesis in the lab, the dental component 20 and the connection assembly 100 are preferably attached to an implant analogue 12. Naturally, a real implant can be used as implant analogue 12.

FIG. 5*b* shows the same configuration as FIG. 5*a*, except for the dental screw 30, which assembles the dental component 20 and the connection assembly 100 by engaging with the dental implant 10. At this point, the recorded position is maintained by the material surrounding the dental component 20.

Figure 6:
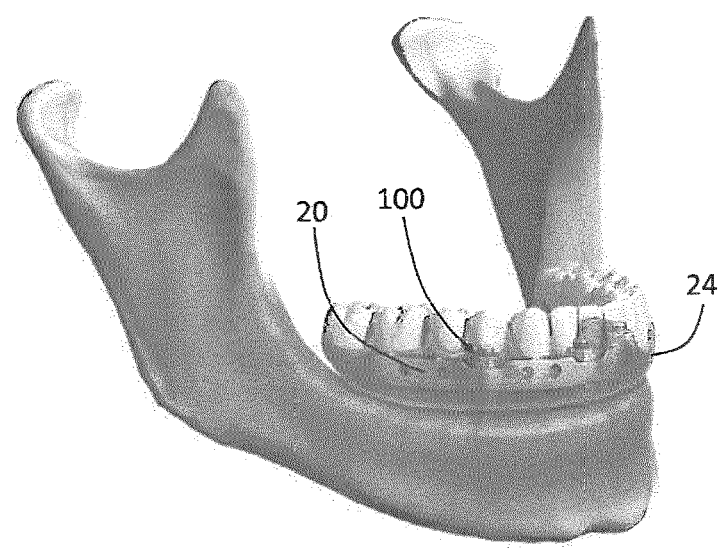
FIG. 6 shows an embodiment, in which a whole denture has been produced using a dental component and a connection assembly according to the present invention.

It is to be noted that the dental prosthesis 24 in FIG. 5 is only shown as a schematic. A more realistic visualization of a dental prosthesis is illustrated in FIG. 6, wherein the underlying superstructure comprising the dental component 20 as well as the connection assembly 100 is shown by visualizing the dental prosthesis only partly opaque. Naturally, these components are not visible in reality.

The person skilled in the art will appreciate that the configuration of the connection assembly 100 shown in the aforementioned figures merely presents a presently preferred embodiment of the present invention. There are multiple modifications possible as has already be explained in detail above in relation to preferred embodiments of the invention. The advantage of the illustrated connection assembly is that the interaction of the bearing surfaces on the coronal and apical side of the dental component 20 allow for a translation as well as a rotation on each side. As a result, a compensation of a misalignment and/or misplacement between the dental component 20 and the dental implant 10 or dental implant analogue efficiently uses the whole volume of the dental component's through hole 23 as a range for adaptation.

As detailed in the summary of the invention, other configurations of the connection assembly are also within the scope of the present invention. For example, the third washer 110 can be replaced by a screw head with an apical bearing surface corresponding to the bearing surface 111. Further, the translational movement provided by the first washer 120 can also be achieved by the through hole 23 of the dental component 20, particularly if the through hole 23 is designed accordingly, for example as a slotted hole. Another option to facilitate translation of the screw in relation to the dental component 20 using a simpler configuration of the connection assembly 100 or less parts is an adaptation of the bearing surfaces involved. More specifically, the contact between these bearing surfaces may be reduced to a line contact or at least a two-point contact. Combining the aforementioned two modifications, i.e. adaptation of the screw head and the through hole 23, even allows for omitting any of the washers on the coronal side of the dental component 20 so that the screw is directly in contact with the mouth of the through hole 23. In such an embodiment, the bearing surface of the screw head adopts the function of the washer's bearing surface. A similar effect can be achieved by providing an interaction between the coronal bearing surface 141 of the fastening element 140 and the apical side 21 of the dental component 20.

As illustrated in FIG. 2, the transition from the through hole 23 of the dental component 20 to either of the washers 120, 130 may be designed using chamfers or adapting the dimension of the through hole so that the dimensions of the through holes' mouths that are in contact with each other are basically a match.

Further and as already summarized above, the screw, which is preferably used as an engaging element, may be replaced by an adhesive in order to record the position and orientation of the dental implant 10 or dental implant analogue in relation to the dental component 20. In such a scenario, the fastening element 140 or more specifically the coronal bearing surface 141 of the fastening element 140 may well be replaced by a corresponding bearing surface directly located on the coronal side of the implant 10 or implant analogue.

Concerning the method for using the connection assembly 100, it is preferably pre-assembled to a dental component 20. This may be done at a production plant as a well as in a dental lab or the dental clinic. In any case, the pre-assembly of the connection assembly 100 does not require any chair time of the patient. Before performing the recording of the orientation and position of the at least one dental implant 10 or dental implant analogue relative to the dental component 20, an appropriate number of implants is implanted in the oral cavity of the patient. The number of implants depends on the treatment necessary for the individual dental situation of the patient.

Preferably after a healing period, the pre-assembled and pre-fastened connection assembly 100 can then be used to record the position and orientation of any implant 10 in relation to the dental component 20 in order to account for any discrepancies that might result in a sub-optimal support of the dental component. This step is performed in a dental clinic but only requires a very limited chair time while the connection assembly 100 is attached to the at least one implant in the mouth of the patient, preferably using aforementioned snap-mechanism. As a result, the connection assembly 100 aligns and positions itself in order to compensate any differences in orientation and position between the dental implant 10 and the dental component 20. Then, the position and orientation of the connection assembly's parts is locked or recorded, preferably by fastening the connection assembly 100 using the first temporary screw 31.

Figure 7:
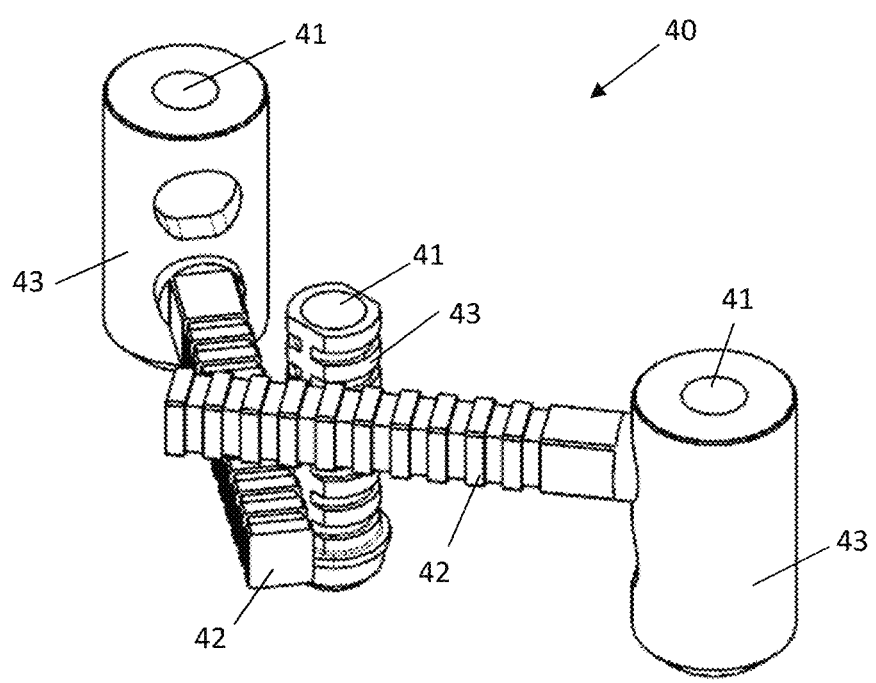
FIG. 7 shows a transfer abutment that is used in a preferred embodiment of the invention during the production of a dental prosthesis using the dental component and the connection assembly.

Instead of recording the position and orientation of an implant 10 in relation to the dental component 20 directly, it is also possible to use a transfer abutment 40. Such a transfer abutment 40 is shown in FIG. 7. Although the transfer abutment 40 in FIG. 7 shows three abutments, the number of abutments depends on the number of dental implants implanted in the oral cavity of a patient. Thus, the number of abutments may be any number between 1 and 6. As previously described, the transfer abutment comprising only one abutment may be combined with a dental impression, preferably a partial dental impression that sufficiently maps the surrounding of the dental implant on order to provide a point of reference for the position and orientation of the dental implant.

In case of a transfer abutment 40, each implant 10 receives an abutment 43 that is preferably fastened using a screw passing a through hole 41 and being engaged with the thread of a dental implant 10. After attaching an abutment 43 to each implant 10, the abutments are brought in contact with each other with transfer abutment connection means 42 such as the bars shown in FIG. 7. Once brought into contact with each other, the parts of the transfer abutment 40 are fixed in relation to each other, preferably using a thermosetting polymer such as wax, acrylic or a resin. Most preferably, a cold or light curing resin suitable for intra-oral use is applied. After the thermosetting polymer is cured, the transfer abutment 40 can be removed from the dental implants 10 in the patient's oral cavity. In this state, the transfer abutment 40 keeps the recorded position and orientation of the at least one implant 10 in relation to at least another implant 10 or at least one adjacent tooth.

This recording subsequently allows for the creation of a model by connecting implant analogues to the connection assembly 100. The position and orientation of the implant analogues is then fixed using common cast techniques for anchoring the analogues relative to each other. More specifically, the implant analogues are integrated in a moldable material after this material has set or cured.

If a transfer abutment 40 is used, the connection assembly 100 is adjusted using the first temporary screw 31 to fix the dental component 20 to the dental implant analogue as previously described for the dental implant.

The connection between the connection assembly 100 and an implant analogue can be achieved by the attachment mechanism 148 or the engagement surface 146 of a fastening element 140 and/or affixing means. The affixing means provide an additional locking of the recorded position and orientation in addition to the fastened state provided by the first temporary screw 31. Thus, the recorded position can be maintained despite a removal of the first temporary screw 31 from the fastening element 140. Afterwards, a second temporary screw 33 or a dental screw 30 may provide a higher strength to the connection between the at least one implant analogue, the connection assembly 100 and the dental component 20.

Preferably, the affixing means is only applied to the dental connection assembly 100 and the dental component 20 so that after removing the first temporary screw 31, the recorded position and orientation stays locked and the connection mechanism 100 together with the dental component 20 may be removed with or without modelling wax applied to it. This allows a verification of the recorded position by placing this arrangement on the implants 10 in the mouth of a patient and preferably fixing this arrangement with an implant screw. This is particularly advantageous in case of using a transfer abutment 40 in order to prevent any misfit that may have occurred after fixing and removing the transfer abutment 40 during recording of the relative position of the at least one implant 10.

During such a test, intraoral jaw relation records for the vertical dimension of occlusion (VDO) and centric relation (CR) may be obtained to register the occlusal relationship of the opposite dental arch to the dental component 20 and, if already applied, the modelling wax.

After casting the model in order to fixate the at least one implant analogue, the creation of a dental prosthesis 24 on top of the dental component 20 may begin or continue using common techniques such as wax-up techniques. In this respect, the second temporary screw 33 preferably has a prolonged head with a larger diameter than the one of the dental screw 30 in order to provide a negative model of a screw channel 25. Further, an articulator may be used if the previously described intraoral jaw relation records are available.

Once the prosthesis 24 is finished, the recorded position is maintained by the surrounding dental prosthesis so that the dental prosthesis 24 including the dental component 20 and the connection assembly 100 can be attached to the at least one implant in the oral cavity of the patient. For example, the dental prosthesis is engaged or snapped into place and fixed using a dental screw 30. Thus, the only chair time needed with the patient is for the attachment of the finished dental prosthesis 24 to the at least one implant 10.

Figure 11:
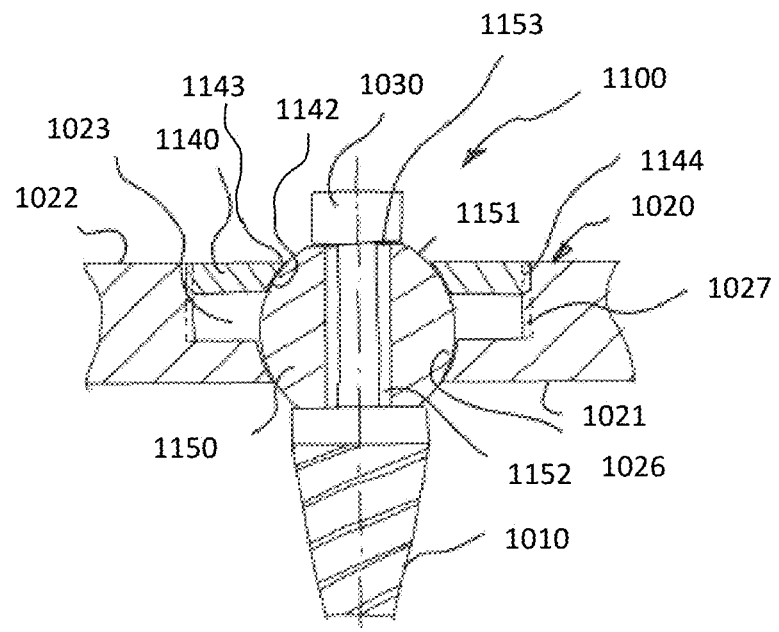
FIGS. 11, 12, 13 and 14 show further embodiments of connection assemblies according to the present invention.

FIG. 11 illustrates another embodiment of a connection assembly attached to a dental component. The connection assembly 1100 comprises a fastening element 1140 and a bearing element 1150. Consequently, the embodiment of FIG. 11 is a configuration of a connection assembly that comprises a low number of parts in order to fulfil the objective of the present invention.

In the exemplary embodiment of FIG. 11, the dental component 1020 comprises a through hole 1023 that has a larger diameter on the coronal side 1022 of the dental component 1020 compared to the diameter of the through hole 1023 on the apical side 1021. Further, the portion of the through hole 1023 having a larger diameter comprises an inner thread 1027 that extends at least partly along the wider portion of the through hole 1023 starting from the coronal side 1022. The narrower portion of the through hole 1023 on the apical side 1021 of the dental component 1020 tapers in an apical-coronal direction in order to form a coronal bearing surface 1026 for interacting with a bearing surface 1151 of the bearing element 1150. The bearing surface 1026 is curved and preferably spherical.

The fastening element 1140 is preferably disc-shaped having an outer diameter that substantially corresponds to the inner diameter of the wider portion of the through hole 1023. The fastening element 1140 comprises an outer thread 1144 that can be brought into engagement with the inner thread 1027 of the dental component 1020. The fastening element 1140 preferably comprises a tool engagement means (not shown) on the coronal side of the fastening element 1140 in order to screw and unscrew the fastening element 1140. The fastening element 1140 comprises a through hole 1143 that includes on its inner surface an apical bearing surface 1142 for interacting with a bearing surface 1151 of the bearing element 1150. The bearing surface 1142 is curved and preferably spherical. The longitudinal axis of the fastening element's through hole 1143 is aligned with the longitudinal axis of the dental component's through hole 1023.

The bearing element 1150 has a curved and preferably spherical shape, wherein the outer surface of the bearing element 1150 forms the bearing surface 1151. In an assembled state of the connection assembly 1100, i.e. in the pre-fastened or fastened state, the coronal side of the bearing surface 1151 interacts with the apical bearing surface 1142 of the fastening element 1140. The apical side of the bearing surface 1151 interacts with the coronal bearing surface 1026 of the dental component 1020.

The bearing element 1150 may further comprise on its apical side an engagement surface (not shown) for connecting the bearing element 1150 to a dental implant 1010 or dental implant analogue.

For attaching the bearing element 1150 to the dental implant 1010 or a dental implant analogue, it comprises a through hole 1152. The through hole 1152 is dimensioned so as to allow for the insertion of an engaging element such as an implant screw 1030 or a second temporary screw, which have been described in detail in relation to the embodiments from above.

Preferably, the through hole 1152 is dimensioned and configured as previously described in relation to an embodiment of the through hole passing through the dental component in an apical-coronal direction and having a larger cross-section or diameter than necessary to be able to insert an implant screw. Such an oversized through hole 1152 allows for a compensation of a misplacement between the dental component 1020 and the dental implant 1010 or dental implant analogue.

During preassembly, the bearing element 1150 is inserted into the through hole 1023 of the dental component 1020 so that the through hole 1152 is oriented in an apical-coronal direction. In a next step, the outer thread 1144 of the fastening element 1140 is brought into engagement with the inner thread 1027 of the dental component's through hole 1023 and is pre-fastened so that a relative movement between the bearing surface 1151 of the bearing element 1150 and the coronal bearing surface 1026 of the dental component 1020 as well as the apical bearing surface 1142 of the fastening element 1140 is still possible in contrast to the fastened state when the bearing element is locked between the bearing surfaces 1026 and 1142.

For compensating a misalignment and/or misplacement between the dental component 1020 and the dental implant 1010 or dental implant analogue, the pre-assembled connection assembly 1100 is preferably placed on the at least one dental implant/dental implant analogue in the previously described pre-fastened state. The engaging element is inserted into the through hole 1152 of the bearing element 1150 and brought into threaded engagement with the dental implant 1010 or dental implant analogue.

If the through hole 1152 of the bearing element 1050 is oversized in order to allow for compensating a misplacement between the dental component 1020 and the dental implant 1010 or dental implant analogue, the above noted engagement surface of the bearing element 1150, if present, has to allow for a movement of the bearing element 1150 in a direction transverse to the longitudinal axis of the dental implant 1010 or dental implant analogue.

After adjustment, the connection assembly 1100 is transferred to the fastened state by tightening the fastening element 1140 so that the bearing element 1150 stays fixed in position.

In order to allow for a recording of the relative position and orientation between dental implants 1010, a washer (not shown) can be placed between the head of the engaging element and a coronal bearing surface 1153 of the bearing element 1150. This washer has flat coronal and apical bearing surfaces and a through hole running perpendicular between these surface. The diameter of the hole is dimensioned so that the shaft of the engaging element can be snugly passed through.

During adjustment, the washer will be moved together with the engaging element in a transverse direction relative to the longitudinal axis of the dental implants 1010. The relative orientation of the dental assembly 1100 is recorded by tightening the fastening element 1140. In order to record the relative position, the washer can, for example, be fixed in position in relation to the bearing element 1150 using any of the affixing means described above.

As a result, the connection assembly 1100 can be integrated in any of the above described workflows for producing a dental prosthesis.

Figure 12:
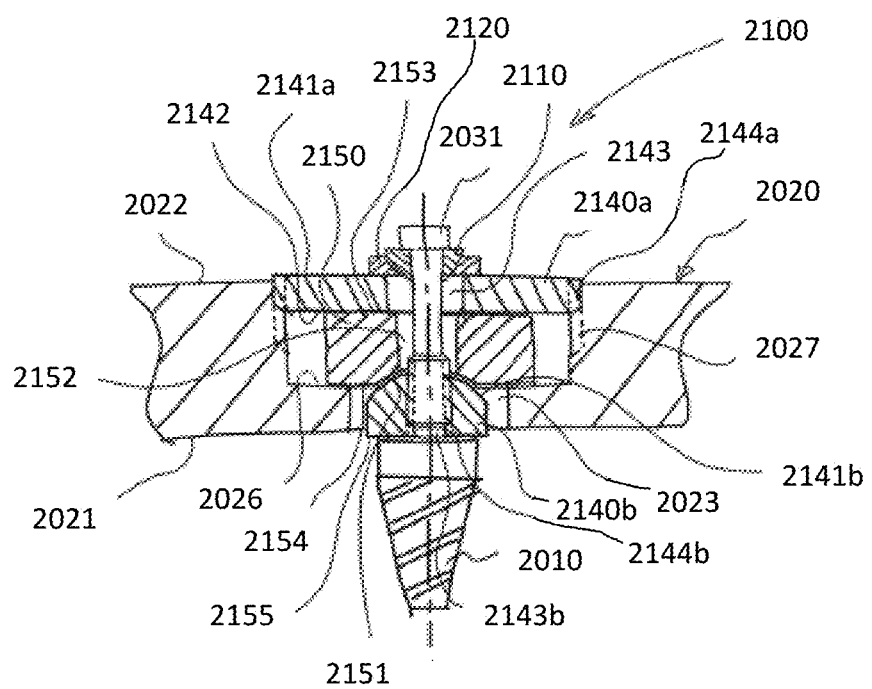

Yet another embodiment of the present invention is shown in FIG. 12. Here, a connection assembly 2100 is mounted to a dental component 2020. The dental component comprises a through hole 2023 which extends throughout the dental component 2020 in an apical-coronal direction. The through hole 2023 has a stepped configuration. This results in a portion having a larger diameter on the dental component's coronal side 2022 and a portion having a smaller diameter on the dental component's apical side 2021. The portion of the hole opening to the coronal side 2022 of the dental component 2020 comprises on its inner circumference and inner thread 2027 like the thread 1027 described in relation to the previous embodiment. The step within the through hole 2023 forms a coronal bearing surface 2026 lying in a plane that is oriented substantially perpendicular to the longitudinal axis of the through hole 2023.

Further, the connection assembly 2100 comprises a first fastening element 2140a that is formed similar to the fastening element 1140 of the previous embodiment except for the through hole 2143a of the first fastening element 2140a not forming a bearing surface. Like the fastening element 1140, the first fastening element 2140a can be brought into engagement with the threaded part of the dental component's through hole 2023 from the coronal side.

The connection assembly 2100 also comprises a second fastening element 2140b that basically corresponds to the fastening element 140 as described in relation to the first two embodiments of the present invention shown in FIGS. 1 to 4 and 8 to 10. The apical side 2147b of the second fastening element 2140b can be attached to a dental implant 2010 or dental implant analogue. Consequently, the second fastening element 2140b is located on the apical side of the connection assembly 2100.

The outermost diameter of the second fastening element 2140b is preferably smaller than the inner diameter of the portion of the through hole 2023 having a smaller diameter in order to allow for a rotational and translational adjustment of the second fastening element 2140b relative to the dental component 2020. The smaller diameter also allows to hide the second fastening element 2140b at least partly inside the portion of the through hole 2023 having a smaller diameter.

Like in the previous embodiment, the connection assembly 2100 comprises a bearing element 2150. However, in difference to the bearing element 1150, which compensates a misalignment between an implant 1010 or implant analogue and a dental component 1020, the bearing element 2150 of the exemplary embodiment shown in FIG. 12 also serves for compensating a misplacement between the dental implant 2010 or dental implant analogue and the dental component 2020.

More specifically, the bearing element 2150 comprises a flat coronal bearing surface 2153 and a flat first apical bearing surface 2154 for compensating a misplacement. The coronal bearing surface 2153 and the apical bearing surface 2154 are perpendicular to the longitudinal axis of the through hole 2152.

The bearing element also comprises a second apical bearing surface 2155 for compensating a misalignment between the dental implant 2010 or dental implant analogue and the dental component 2020. The apical bearing surface 2155 of the bearing element 2150 is curved and preferably spherical. It is configured to interact with the corresponding coronal bearing surface 2141b of the second fastening element 2140b. The second apical bearing surface 2155 is preferably located inside the first apical bearing surface 2154. As a result, the first apical bearing surface 2154 is ring-shaped.

The bearing element 2150 also comprises a through hole 2152 extending in an apical-coronal direction and is preferably disc-shaped. The outermost diameter of the bearing element 2150 is smaller than the inner diameter of the portion of the through hole 2023 having the larger diameter in order to allow for a relative movement between the bearing element 2150 and the dental component 2020 in a transverse direction to the longitudinal axis of the through hole 2023.

Preferably, the connection assembly 2100 also comprises a first washer 2120 and a third washer 2110 as previously described in order to allow the use of a screw having a flat apical bearing or support surface. Alternatively, only a first washer 2120 is used with a screw having a corresponding curved and preferably spherical apical support surface.

For an increase of the rotational adjustment range, the through hole 2143 of the first fastening element 2140a is preferably bigger that the through hole 2152 of the bearing element 2150.

Preferably, the connection assembly 2100 is preassembled in a pre-fastened state. In a first step, the bearing element 2150 is inserted into the through hole 2023 of the dental component 2020 from the coronal side 2022 until the apical bearing surface 2154 gets in contact with the coronal bearing surface 2026. Afterwards, the outer thread 2144a of the first fastening element 2140a is brought into engagement with the inner thread 2027 of the dental component 2020.

In the assembled and fastened state, the apical bearing surface 2154 is in contact with the coronal bearing surface 2026. On the coronal side of the bearing element 2150, the coronal bearing surface 2153 is in contact with the apical bearing surface 2142a of the fastening element 2140a. However, in the preassembled state, the first fastening element 2140a is only screwed into the dental component 2022 to a degree that allows for an adjustment of a misplacement between the bearing element 2150 and the dental component 2020.

The part of the connection assembly 2100 allowing for a compensation of a misalignment is preassembled by placing a first washer 2120 on the coronal bearing surface 2141a of the first fastening element 2140a. If a screw with a flat apical support surface is used, a third washer 2110 is in turn placed on the coronal bearing surface of the first washer as already described in more detail in relation to the first two embodiments.

Further, the coronal bearing surface 2141b of the second fastening element 2140b is brought into contact with the second apical bearing surface 2155. With the second fastening element 2140b, the first washer 2120 and optionally the third washer 2110 in position, an engaging element, such as a first temporary screw 2031, is inserted through the holes 2143 and 2152 and brought into engagement with a threaded part of the second fastening element's through hole 2143b.

For the pre-assembled state, i. e. in order to allow for a relative rotational movement between the second apical bearing surface 2155 and the coronal bearing surface 2141b as well as between the coronal surface of the first washer 2120 and either the apical bearing surface of the third washer 2110 or the apical support surface of the screw 2031, and a relative translational movement between the flat apical surface of the first washer and the flat coronal bearing surface 2141a of the first fastening element 2140a, a first temporary screw 2031 is not fully fastened. It is to be noted that instead of a first temporary screw 2031, a second temporary screw or an implant screw, as described above, may be used to preassemble the connection assembly 2100.

Instead of the through hole 2143b of the second fastening element 2140b having a thread 2144b, an affixing means may be used, in particular between the bearing surfaces, to transfer the connection assembly 2100 from the pre-fastened to the fastened state.

In order to be able to record the relative rotation between the implants 2010 or dental implant analogues, the first temporary screw or affixing means may be used. Nonetheless, if recording of the relative position and orientation of the dental implants in relation to each other is performed using the previously described transfer abutment 80, the connection assembly 2100 is preferably preassembled using an implant screw.

Concerning the remaining steps of the above-described workflows for producing a dental restoration, the application of the connection assembly 2100 basically corresponds to the application of the connection assembly described in the previous embodiments.

Figure 13:
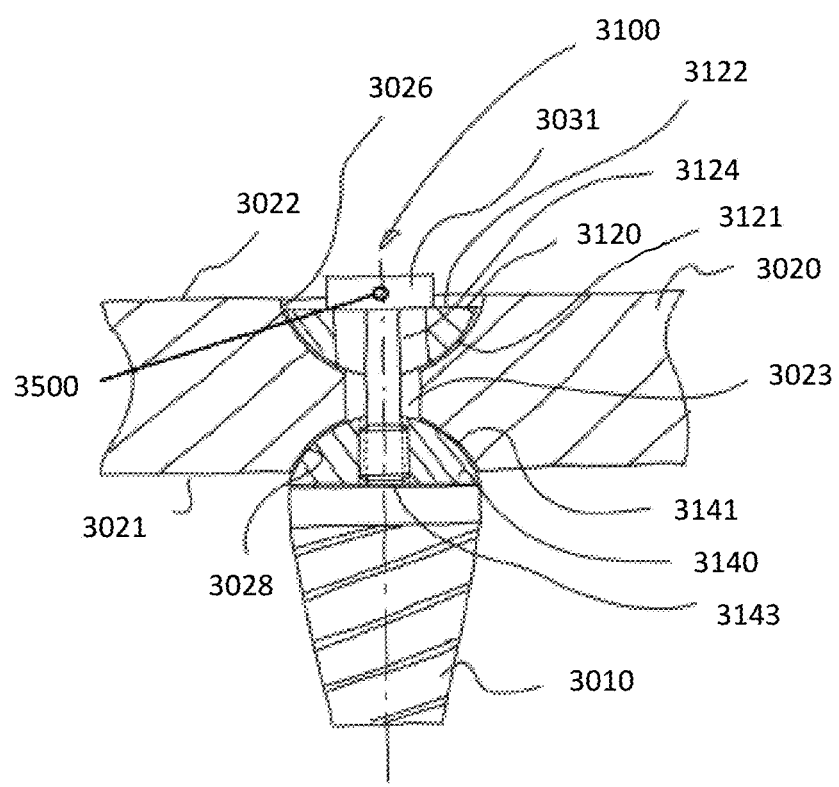

FIG. 13 describes yet another embodiment of a dental connection assembly. The connection assembly 3100 requires similar to the connection assembly 1100 a comparatively low number of parts. More specifically, the connection assembly 3100 comprises a first washer 3120, a fastening element 3140 and an engaging element such as a first temporary screw 3031, a second temporary screw or an implant screw.

The dental component 3020 of FIG. 13 comprises a through hole 3023. The through hole tapers outwards on both the coronal side 3022 and the apical side 3021 of the dental component 3020. The tapered portions of the through hole form a coronal bearing surface 3026 and an apical bearing surface 3028. The coronal bearing surface 3026 and the apical bearing surface 3028 are both curved and preferably spherical.

The first washer 3120 comprises a flat coronal bearing surface 3122, an apical bearing surface 3121 corresponding to the coronal bearing surface 3026 of the dental component 3020 and a through hole 3124 in an apical-coronal direction for insertion of the engaging element.

The fastening element 3140 basically corresponds to the fastening element 140 described in relation to the first and second embodiment.

In order to preassemble the connection assembly 3100, the apical bearing surface 3121 of the first washer 3120 is placed against the coronal bearing surface 3026 of the dental component 3020. The coronal bearing surface 3141 of the fastening element 3140 is placed against the apical bearing surface 3028 of the dental component 3020. An engaging element is inserted through the through hole 3124 of the first washer 3120 and the through hole 3023 of the dental component 3020 and is brought into engagement with a thread provided in the through hole 3143 of the fastening element 3140. If no recording for transferring the relative orientation between dental implants 3010 in the mouth of a patient is desired, the first temporary screw 3031 can be replaced with an implant screw or a second temporary screw.

For increasing the maximum relative rotation between the dental component 3020 and the dental implant 3010 or a dental implant analogue and, thus, the available range of adjustment, the diameter of the through hole 3124 of the first washer 3120 is preferably bigger than the diameter of the through hole 3023 of the dental component 3020 in between the tapering portions of the through hole 3023. Further, this diameter of the through hole 3023 is bigger than the one of the through hole 3143 extending through the fastening element 3140. In general, the bigger the diameters of the through holes 3023 and 3124, the bigger the rotational range of adjustment.

In order to allow for a rotational and translational adjustment, the fastening element 3140 may be configured to be movable in a transverse direction in relation to the longitudinal axis of the dental implant 3010 or dental implant analogue. In this case, the connection assembly 3100 may be mounted to a dental implant 3010 or dental implant analogue together with the dental component 3020, wherein the through hole 3143 in the fastening element 3140 in relation to the shaft of the implant screw is large enough to provide a range of adjustment in said transverse direction.

To compensate for an angulation between coronal bearing surface 3122 and the surface of the screw head 3031 in contact with the coronal bearing surface 3122, the screw head 3031 comprises a hinge or ball joint 3500.

If it is desired to record the relative rotational position between dental implants 3010 in the mouth of a patient, the engaging element, in particular a first temporary screw, is tightened. Even if an implant screw is used, a recording may be established by providing affixing means between the coronal bearing surface 3141 of the fastening element 3140 and the apical bearing surface 3028 of the dental component 3020. For recording the relative position of dental implants 3010, a washer together with affixing means may be used, as described in detail in relation to FIG. 11.

In addition or as alternative for facilitating a translational adjustment using the previously described oversized holes, the connection assembly 3100 may be combined with a connection assembly of one of the previous embodiments along the longitudinal direction of the dental component, which interacts with a another dental implant 3010 or dental implant analogue.

Consequently, it is also within the scope of the present invention to combine the ability of different embodiments for translational and rotational adjustment in order to maximize the range of adjustment for compensating a misplacement and/or misalignment between at least implants or implant analogues and a dental component.

Also this embodiment of a connection assembly fulfils the objective of the present invention and can be integrated into the previously described workflows.

Figure 14:
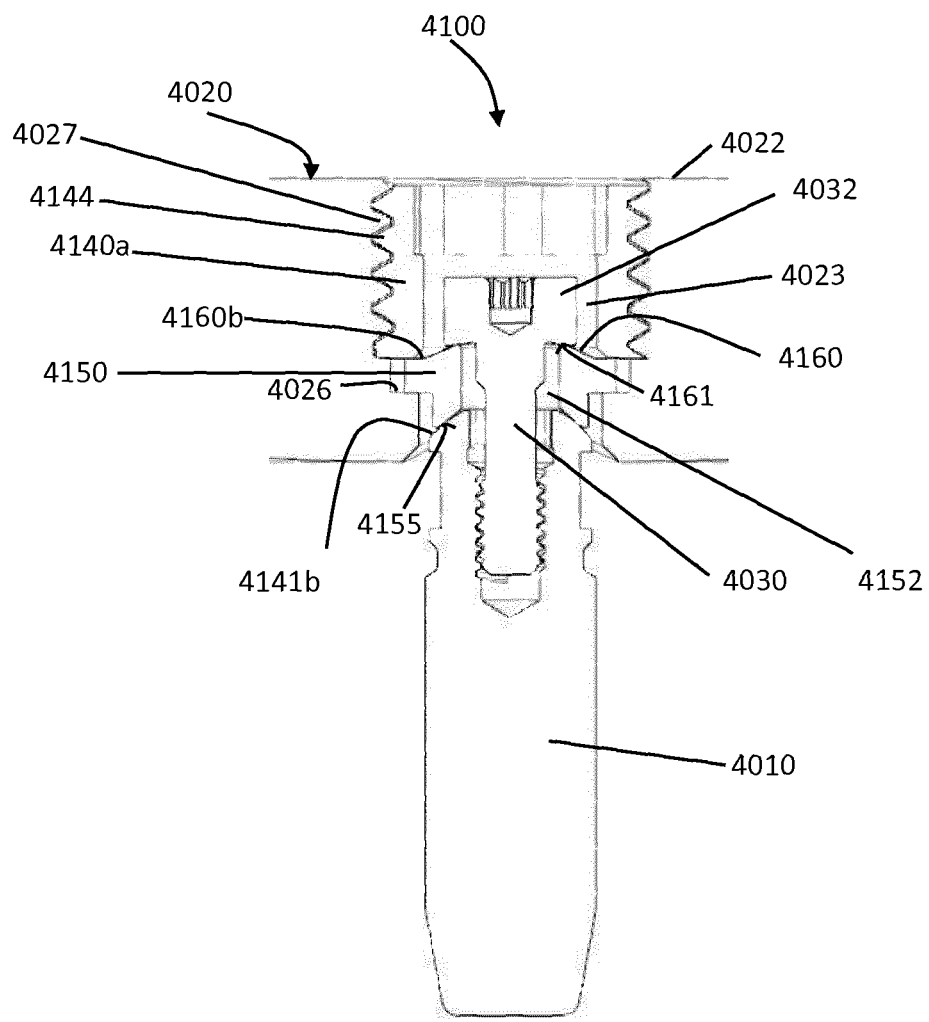

FIG. 14 describes a further alternative embodiment of the present invention. Here, a connection assembly 4100 is mounted to a dental component 4020.

The dental implant 4010 comprises a coronal bearing surface 4141*b* for supporting a bearing element 4150. Effectively, the dental implant 4010 with the coronal bearing surface 4141*b* represents a one piece embodiment of the dental implant 2010 and second bearing element 2140*b* according to FIG. 12. Naturally, the dental implant 4010 with the coronal bearing surface 4141*b* could also be formed as a two piece embodiment as shown in FIG. 12. The coronal bearing surface 4141*b* is curved, in particular spherical.

The dental component 4020 comprises a through hole 4023 which extends throughout the dental component 4020 in an apical-coronal direction. The through hole 4023 has a stepped configuration. This results in a portion having a larger diameter on the dental component's coronal side 4022 and a portion having a smaller diameter on the dental component's apical side. The portion of the hole opening to the coronal side 4022 of the dental component 4020 comprises on its inner circumference an inner thread 4027. The step within the through hole 4023 forms a coronal bearing surface 4026 lying in a plane that is oriented substantially perpendicular to the longitudinal axis of the through hole 4023.

Further, the connection assembly 4100 comprises a first fastening element 4140*a*. The first fastening element 4140*a* can be brought into engagement with the inner thread 4027 of the dental component's through hole 4023 from the coronal side via an outer thread 4144.

The coronal bearing surface 4141*b* is curved, in particular spherical. The bearing element 4150 has an apical bearing surface 4155 matching the curvature of the coronal bearing surface 4141*b*. In addition, the bearing element 4150 has a first coronal bearing surface 4160, which is also curved, in particular spherical. In addition, the bearing element 4150 has a second coronal bearing surface 4160*b* for engaging an apical bearing surface of the first fastening element 4140*a*.

A dental screw 4030 comprises a screw head 4032. The screw head 4032 has an apical bearing surface 4161 matching the coronal bearing surface 4160 of the bearing element 4150. The dental screw 4030 can engage the dental implant 4010 via a threaded engagement. For this, the bearing element 4150 has a through hole 4152 for the dental screw 4030

In a pre-fastened state, the first fastening element 4140*a* engages the inner thread inner thread 4027 capturing the bearing element 4150 between the coronal bearing surface 4026 and the apical bearing surface of the first fastening element 4140*a*. The dental screw 4030 can e.g. be captured in through hole 4023 with a cover (not shown).

Concerning the remaining steps of the above-described workflows for producing a dental restoration, the application of the connection assembly 4100 basically corresponds to the application of the connection assembly described in the previous embodiments.

In contrast to other techniques known from the prior art, there is no need for any dental impressions after implantation of the implants when applying a method of the present invention. Thus, the present invention provides the means and methods for producing or making a dental prosthesis and installing the dental prosthesis with a minimum of chair time, low cost and barely any inconvenience caused to the patient.

REFERENCE SIGNS

10 dental implant or dental implant analogue
11 groove
12 dental implant analogue
20 dental component
21 apical side of dental component
22 coronal side of dental component
23 through hole of dental component
24 dental prosthesis
25 screw channel of dental prosthesis
30 dental screw or implant screw
30a head of dental screw
31 first temporary screw
32 screw head of first temporary screw
33 second temporary screw
34 threads of first temporary screw
35 first temporary-screw shaft
36 second temporary-screw shaft
37 implant-screw shaft
40 transfer abutment
41 through hole
42 transfer abutment connection means
43 abutment
100 connection assembly
110 third washer
111 apical bearing surface of third washer
112 coronal (bearing) surface of third washer
114 through hole of third washer
120 first washer
121 apical bearing surface of first washer
122 coronal bearing surface of first washer
124 through hole of first washer
130 second washer
131 coronal bearing surface of second washer
132 apical bearing surface of second washer
134 through hole of second washer
140 fastening element
141 coronal bearing surface of fastening element
143 through hole of fastening element
146 engagement surface
148 snap-mechanism
149 stop surface
1000 embodiment of the present invention with reference numerals corresponding to previously described embodiments and:
1026 coronal bearing surface of the dental component
1027 inner thread of the dental component
1142 apical bearing surface of the fastening element
1144 outer thread of the fastening element
1150 bearing element
1151 bearing surface of the bearing element
1152 through hole of the bearing element
1153 coronal bearing surface of the bearing element
2000 embodiment of the present invention with reference numerals corresponding to previously described embodiments and:
2140a first fastening element
2140b second fastening element
2141a coronal bearing surface of the first fastening element
2141b coronal bearing surface of the second fastening element
2143a through hole of the first fastening element
2143b through hole of the second fastening element
2144a outer thread of first fastening element
2144b inner thread of second fastening elements
2147a apical side of first fastening element
2147b apical side of second fastening element
2150 bearing element
2151 bearing surface of the bearing element
2152 through hole of the bearing element
2153 coronal bearing surface
2154 first apical bearing surface of the bearing element
2155 second apical bearing surface of the bearing element
3000 embodiment of the present invention with reference numerals corresponding to previously described embodiments and:
3028 apical bearing surface of the dental component
4000 embodiment of the present invention with reference numerals corresponding to previously described embodiments

The invention claimed is:

1. A connection assembly configured to attach a dental component to a dental implant or a dental implant analogue, the connection assembly comprising:
   a first fastener comprising an attachment configured to engage the dental implant or the dental implant analogue with no rotational restriction relative to a longitudinal axis of the dental implant or the dental implant analogue and in a detachable manner, the attachment formed as a snap-mechanism or as a snug fit, wherein a portion of the first fastener is configured to sit above the dental implant or the dental implant analogue; and
   a second fastener configured to fasten the dental component to the first fastener, the second fastener formed such that it does not engage the dental implant or the dental implant analogue,
   wherein the connection assembly is removably attachable to the dental implant or the dental implant analogue, and the dental component is attachable to the connection assembly in a pre-fastened state and a fastened state,
   wherein in the pre-fastened state, when the connection assembly is attached to the dental implant or the dental implant analogue via the first fastener, the connection assembly allows for adjustment of a relative position and/or orientation between the dental component and the dental implant or the dental implant analogue, and
   wherein in the fastened state, the relative position and/or orientation between the dental component and the connection assembly is fixed via the second fastener, while the connection assembly is detachable via the snap-mechanism or the snug fit attachment from the dental implant or the dental implant analogue with the dental component attached to the connection assembly in the fastened state.

2. The connection assembly according to claim 1, comprising:
   an apical bearing arranged apically of the dental component, and/or a coronal bearing arranged coronally of the dental component.

3. The connection assembly according to claim 2, wherein the coronal bearing is formed by a first washer and/or a third washer.

4. The connection assembly according to claim 3, wherein the third washer is configured to be arranged apically of a screw head, the third washer having an apical bearing surface, a coronal surface, a through hole for a dental screw or temporary screw, the through hole extending from the coronal surface to the apical bearing surface.

5. The connection assembly according to claim 3, comprising the first washer to be interposed between the dental component and the apical bearing surface of the third washer and/or a second washer to be interposed between the dental component and the coronal bearing surface of the first fastener.

6. The connection assembly according to claim 5, wherein contact between the first washer or a coronal side of the dental component and the apical bearing surface of the third washer is configured to be a surface contact.

7. The connection assembly according to claim 6, wherein the surface contact is established by spherical bearing surfaces.

8. The connection assembly according to claim 2, wherein the apical bearing is formed by a second washer.

9. The connection assembly according to claim 1, wherein the first fastener comprises an apical and/or coronal bearing surface, and a through hole.

10. The connection assembly according to claim 9, comprising at least one washer to be interposed between the dental component and a screw head of a first temporary screw or the coronal bearing surface of the first fastener, wherein the first fastener is placed on the apical side of the dental component.

11. The connection assembly according to claim 10, wherein the washer comprises two bearing surfaces situated on opposite sides of the washer, at least one of the bearing surfaces being a flat bearing surface.

12. The connection assembly according to claim 9, wherein contact between a second washer or an apical side of the dental component and the coronal bearing surface of the first fastener is configured to be a surface contact.

13. The connection assembly according to claim 12, wherein the surface contact is established by spherical bearing surfaces.

14. The connection assembly according to claim 9, wherein the second fastener is chosen from at least one of the following: a first temporary screw formed such that it does not engage the dental implant or the dental implant analogue and formed to engage the through hole, an adhesive, or a thermosetting resin.

15. The connection assembly according to claim 14, wherein an implant screw, the first temporary screw and/or a second temporary screw can be operated independently of the attachment.

16. The connection assembly according to claim 9, wherein the coronal bearing surface of the first fastener comprises a curved surface.

17. The connection assembly according to claim 1, comprising an implant screw, wherein the implant screw is formed to engage the dental implant or the dental implant analogue to fasten the connection assembly to the dental implant or dental implant analogue.

18. The connection assembly according to claim 1, wherein the attachment is formed as a snap-mechanism, wherein the first fastener is rotatable relative to a longitudinal axis of the dental implant or the dental implant analogue when attached to the dental implant or the dental implant analogue.

19. A dental component of the connection assembly according to claim 1, the dental component configured to attach to a dental implant or a dental implant analogue comprising at least one through hole extending from an apical side to a coronal side of the dental component configured to receive an implant screw, a first temporary screw or a second temporary screw.

20. The dental component according to claim 19, wherein one of the apical side and coronal side is a spherical bearing surface.

21. The connection assembly according to claim 20, wherein the other of the apical side and coronal side is a flat bearing surface.

22. The connection assembly according to claim 1, wherein the dental component is attached to the connection assembly.

23. The connection assembly according to claim 1, wherein the attachment is formed as a snug fit, and wherein the snug fit comprises an engagement surface configured to fit into and/or onto the dental implant or the dental implant analogue.

24. A method of assembling a dental component to a connection assembly, the method comprising:
providing the dental component comprising at least one through hole;
providing the connection assembly comprising a first fastener, a second fastener configured to engage a through hole of the first fastener to fasten the dental component to the first fastener, wherein the first fastener comprises an attachment configured to engage a dental implant or a dental implant analogue with no rotational restriction relative to a longitudinal axis of the dental implant or the dental implant analogue, wherein a portion of the first fastener is configured to sit above the dental implant or the dental implant analogue, wherein the second fastener is formed such that it does not engage the dental implant or the dental implant analogue, and at least one washer; and
engaging the first fastener with the second fastener so that the first fastener and the second fastener are movable relative to the through hole of the dental component.

25. A method of assembling a dental prosthesis, comprising:
obtaining a dental component attached to a connection assembly in a fastened and adjusted state, the dental component attached to the connection assembly with the method according to claim 24; and
attaching the first fastener of the connection assembly to a dental implant analogue.

26. A method of assembling a dental prosthesis, comprising:
providing a model of a dental situation of a patient comprising at least one dental implant analogue;
providing a dental component and a connection assembly in a pre-fastened state by a second fastener;
mounting the dental component and the connection assembly on the dental implant analogue, wherein the dental component and the connection assembly were assembled with a method according to claim 24;
adjusting the position and/or orientation of the dental component relative to the dental implant analogue by adjusting the connection assembly;

locking the second fastener to fix the position and/or orientation of the dental connection assembly relative to the dental component.

27. A method of adjusting the position and/or orientation of a dental component relative to a dental implant or a dental implant analogue with a connection assembly, comprising:
mounting the dental component and the connection assembly on a dental implant or a dental implant analogue, wherein the connection assembly comprises a first fastener and a second fastener;
attaching the first fastener to the dental implant or the dental implant analogue, with an attachment configured to engage the dental implant or dental implant analogue with no rotational restriction relative to a longitudinal axis of the dental implant or the dental implant analogue and in a detachable manner wherein a portion of the first fastener is configured to sit above the dental implant or the dental implant analogue;
adjusting the position and/or orientation of the dental component relative to the dental implant or the dental implant analogue by adjusting the connection assembly; and
locking the engagement between the second fastener and the first fastener to fix the position and/or orientation of the dental connection assembly relative to the dental component while keeping the connection assembly detachable from the dental implant or the dental implant analogue by the second fastener being formed such that it does not engage the dental implant or the dental implant analogue.

* * * * *